(12) United States Patent
Fielder

(10) Patent No.: US 10,320,765 B2
(45) Date of Patent: Jun. 11, 2019

(54) METHOD AND SYSTEM FOR SECURING COMMUNICATION

(71) Applicant: PACid Technologies, LLC, Austin, TX (US)

(72) Inventor: Guy Fielder, Austin, TX (US)

(73) Assignee: PACid Technologies, LLC, Austin, TX (US)

( * ) Notice: Subject to any disclaimer, the term of this patent is extended or adjusted under 35 U.S.C. 154(b) by 0 days.

(21) Appl. No.: 14/643,560

(22) Filed: Mar. 10, 2015

(65) Prior Publication Data

US 2015/0188901 A1   Jul. 2, 2015

Related U.S. Application Data

(63) Continuation of application No. 13/930,846, filed on Jun. 28, 2013, now Pat. No. 9,009,484, which is a
(Continued)

(51) Int. Cl.
*G06F 21/62* (2013.01)
*H04L 9/06* (2006.01)
(Continued)

(52) U.S. Cl.
CPC .......... *H04L 63/08* (2013.01); *G06F 21/6209* (2013.01); *H04L 9/0643* (2013.01); *H04L 9/0866* (2013.01); *H04L 9/0891* (2013.01); *H04L 9/32* (2013.01); *H04L 9/3228* (2013.01); *H04L 63/0876* (2013.01)

(58) Field of Classification Search
CPC .. H04L 63/08; H04L 63/0876; G06F 21/6209
See application file for complete search history.

(56) References Cited

U.S. PATENT DOCUMENTS

| 4,613,901 A | 9/1986 | Gilhousen et al. |
| 4,649,233 A | 3/1987 | Bass et al. |

(Continued)

FOREIGN PATENT DOCUMENTS

| EP | 1304848 A2 | 4/2003 |
| EP | 1478156 A2 | 11/2004 |

(Continued)

OTHER PUBLICATIONS

International Search Report and the Written Opinion issued in PCT/US2010/028583; dated Jul. 6, 2010; (14 pages).
(Continued)

*Primary Examiner* — Farid Homayounmehr
*Assistant Examiner* — Suman Debnath
(74) *Attorney, Agent, or Firm* — Ascenda Law Group, PC

(57) ABSTRACT

A method for obtaining a secure communication session includes a first member computing device receiving, via a first communication channel, a first input from a second member computing device, sending, via a second communication channel, a second input to the second member computing device, and receiving, via the first communication channel, the second input from the second member computing device. The secure communication session is initiated based on the first input and second input.

14 Claims, 16 Drawing Sheets

Related U.S. Application Data continuation of application No. 13/203,344, filed as application No. PCT/US2010/028565 on Mar. 25, 2010, now Pat. No. 8,539,241.

(60) Provisional application No. 61/163,414, filed on Mar. 25, 2009.

(51) Int. Cl.
  *H04L 9/08* (2006.01)
  *H04L 29/06* (2006.01)
  *H04L 9/32* (2006.01)

(56) References Cited

U.S. PATENT DOCUMENTS

| | | |
|---|---|---|
| 4,720,860 A | 1/1988 | Weiss |
| 4,864,615 A | 9/1989 | Bennett et al. |
| 4,924,515 A | 5/1990 | Matyas et al. |
| 4,937,866 A | 6/1990 | Crowther et al. |
| 5,020,105 A | 5/1991 | Rosen et al. |
| 5,060,263 A | 10/1991 | Bosen et al. |
| 5,065,429 A | 11/1991 | Lang |
| 5,068,894 A | 11/1991 | Hoppe |
| 5,153,919 A | 10/1992 | Reeds, III et al. |
| 5,233,655 A | 8/1993 | Shapiro |
| 5,237,610 A | 8/1993 | Gammie et al. |
| 5,241,598 A | 8/1993 | Raith |
| 5,309,516 A | 5/1994 | Takaragi et al. |
| 5,355,413 A | 10/1994 | Ohno |
| 5,361,062 A | 11/1994 | Weiss et al. |
| 5,367,572 A | 11/1994 | Weiss |
| 5,475,758 A | 12/1995 | Kikuchi |
| 5,475,826 A | 12/1995 | Fischer |
| 5,481,611 A | 1/1996 | Owens et al. |
| 5,495,533 A | 2/1996 | Linehan et al. |
| 5,638,448 A | 6/1997 | Nguyen |
| 5,757,924 A | 5/1998 | Friedman et al. |
| 5,796,830 A | 8/1998 | Johnson et al. |
| 5,953,420 A * | 9/1999 | Matyas, Jr. ............ H04L 9/0844 380/285 |
| 5,963,646 A | 10/1999 | Fielder et al. |
| 5,963,696 A | 10/1999 | Yoshida et al. |
| 5,966,441 A | 10/1999 | Calamera |
| 5,974,550 A | 10/1999 | Maliszewski |
| 5,995,623 A | 11/1999 | Kawano et al. |
| 5,995,624 A | 11/1999 | Fielder et al. |
| 6,049,612 A | 4/2000 | Fielder et al. |
| 6,105,133 A | 8/2000 | Fielder et al. |
| 6,345,101 B1 | 2/2002 | Shukla |
| 6,490,353 B1 | 12/2002 | Tan |
| 6,587,563 B1 | 7/2003 | Crandall |
| 6,636,968 B1 | 10/2003 | Rosner et al. |
| 6,769,060 B1 | 7/2004 | Dent et al. |
| 6,947,556 B1 | 9/2005 | Matyas, Jr. et al. |
| 6,987,853 B2 | 1/2006 | Uner |
| 7,032,240 B1 | 4/2006 | Cronce et al. |
| 7,095,855 B1 | 8/2006 | Collins |
| 7,178,025 B2 | 2/2007 | Scheidt et al. |
| 7,890,769 B2 | 2/2011 | Chen et al. |
| 8,416,954 B1 | 4/2013 | Raizen et al. |
| 2002/0143872 A1 | 10/2002 | Weiss et al. |
| 2002/0191796 A1 | 12/2002 | Muschenborn |
| 2004/0025028 A1 | 2/2004 | Takeuchi |
| 2004/0179684 A1 | 9/2004 | Appenzeller et al. |
| 2004/0230800 A1 * | 11/2004 | Futa ........................ G06F 21/32 713/169 |
| 2005/0039030 A1 | 2/2005 | Rodgers et al. |
| 2005/0063352 A1 | 3/2005 | Amara et al. |
| 2005/0076061 A1 | 4/2005 | Cox |
| 2006/0112418 A1 | 5/2006 | Bantz et al. |
| 2006/0174349 A1 | 8/2006 | Cronce et al. |
| 2006/0210082 A1 | 9/2006 | Devadas et al. |
| 2006/0271697 A1 * | 11/2006 | Kruse ............... H04L 29/08072 709/230 |
| 2007/0130463 A1 | 6/2007 | Law et al. |
| 2007/0150742 A1 | 6/2007 | Cukier et al. |
| 2007/0255941 A1 | 11/2007 | Ellis |
| 2007/0258584 A1 | 11/2007 | Brown et al. |
| 2008/0065880 A1 | 3/2008 | Martin |
| 2008/0098464 A1 * | 4/2008 | Mizrah .................. G06F 21/36 726/5 |
| 2008/0144787 A1 * | 6/2008 | Gantman ................ H04M 1/68 379/93.03 |
| 2008/0148369 A1 * | 6/2008 | Aaron ................. G07C 9/00309 726/5 |
| 2008/0244078 A1 | 10/2008 | Viljoen et al. |
| 2008/0263363 A1 | 10/2008 | Jueneman et al. |
| 2008/0270791 A1 | 10/2008 | Nystrom et al. |
| 2009/0094520 A1 | 4/2009 | Kulas |
| 2010/0070778 A1 | 3/2010 | Murray |
| 2010/0122327 A1 * | 5/2010 | Linecker ................ H04L 63/08 726/6 |
| 2010/0217964 A1 | 8/2010 | Peterka et al. |

FOREIGN PATENT DOCUMENTS

| | | |
|---|---|---|
| EP | 1906587 A2 | 4/2008 |
| GB | 2421407 A | 6/2006 |
| GB | 2478147 A | 8/2011 |
| WO | 9847258 A2 | 10/1998 |
| WO | 03077469 A1 | 9/2003 |
| WO | 2004092864 A2 | 10/2004 |
| WO | 2005107287 A1 | 11/2005 |
| WO | 2005119397 A1 | 12/2005 |
| WO | 2007005909 A2 | 1/2007 |
| WO | 2008061848 A2 | 5/2008 |
| WO | 2009074956 A1 | 6/2009 |
| WO | 2010103345 A1 | 9/2010 |
| WO | 2010149407 A1 | 12/2010 |
| WO | 2011068719 A1 | 6/2011 |
| WO | 2011089143 A1 | 7/2011 |

OTHER PUBLICATIONS

International Search Report and the Written Opinion issued in PCT/US2010/028582; dated Jul. 30, 2010; (14 pages).

Yuill, J., Denning, D., Feer, F.; "Using Deception to Hide Things from Hackers: Processes, Principles, and Techniques", Journal of Information Warfare, (16 pages).

Schneider, B., "Security Pitfalls in Cryptography", Counterpane Systems, www.counterpane.com/publish.html, 1998, (11 pages).

Schneier, B., "Why Cryptography is Harder Than it Looks", Counterpane Systems, www.counterpane.com/publish.html, 1997, (8 pages).

Schneier, B., "Cryptographic Design Vulnerabilities", Counterpane Systems, www.counterpane.com/publish.html, Sep. 1998, (5 pages).

Bellare, Mihir Rogaway, Phillip, "Entity Authentication and Key Distribution," Advances in Crypto 1993 Proceedings, Springer-Verlag (Aug. 1993).

Bird, R. et al, "The KryptoKnight Family of Light-Weight Protocols for Authentication and Key Distribution," IEEE/ACM Transactions on Networking, vol. 3, No. 1, pp. 31-41, IEEE Press, Piscataway, NJ, Feb. 1995.

Damgard, I.B., "A Design Principle for Hash Functions,", Springer-Verlag, New York, 1998.

Gong, L., "Using One-Way Functions for Authentication," ACM Sigcom computer Communication Review, vol. 19, Issue 5, pp. 8-11, New York, 1989.

Krawczyk, H., "SKEME: A Versatile Secure Key Exchange Mechanism for Internet," Proceedings of the 1996 Sympoium on Network and Distributed System Security (SNDSS) '96, pp. 114-127, IEEE Computer Society, Washington, DC (1996).

Leighton, T.and Micali, Silvio, "Secret Key Agreement without Public-Key Cryptography", Springer-Verlag, New York, 1998.

Matyas, S.M. & Meyer, C.H., "Generation, Distribution, and Installation of Cryptograpic Keys," 17 IBM Sys. J. 2 (1978).

Merkle, R., "One Way Hash functions and DES," In In G. Brassard, editor, Advances in Cryptology: Proceedings of Crypto'89, vol. 435 of Lecture Notes in Computer Science, pp. 428-446, Springer-Verlag, New York, 1990.

(56) References Cited

OTHER PUBLICATIONS

Molva, Reflik et al., "KryptoKnight Authentication and Key Distibution System," Computer Security—ESORICS 92 (Nov. 23-25, 1992).
Menezes, Alfred J. et al., Handbook of Applied Cryptography, CRC Press, Oct. 16, 1996.
Preneel, B., "MDx-MAC and Building Fast MACs from Hash Functions," Lecture Notes in Computer Science; vol. 963, Proceedings of the 15th Annual International Cryptology Conference on Advances in Cryptology, pp. 1-14, Springer-Verlag, London, UK (1995).
Schneier, Bruce, Applied Cryptography, Katherine Schowalter, 1996 (and first edition (1994) of same).
Freier, A. et al., "SSL Version 3.0," Netscape Communications Corporation, Dec. 1995.
RSA Laboratories, "PKCS #5: Password-Based Encryption Standard," version 1.5, Nov. 1993.
Rivest, R., "The MD5 Message-Digest Algorithm," IETF RFC 1321, Apr. 1992.
Berson, Thomas A., "Differential Cryptanalysis Mod 232 with Applications to MD5". Eurocrypt. (1992).
Bert den Boer, Antoon Bosselaers (1993). Collisions for the Compression Function of MD5. Berlin; London: Soringer. ISBN 3-540-57600-2.
Kelsey, John et al., "Passphrase FAQ," alt.security.pgp, Oct. 1993.
"Windows '95 Vulnerabilities", US Department of Energy, Computer Incident Advisory Committee, available at http://ftp.cerias.purdue.edu/pub/lists/academic-firewalls/academic-firewalls.951224 (1995).
Carl Meyer and S.M. Matyas, Cryptography: A New Dimension in Computer Data Security (1982).
Hans Dobbertin, Cryptanalysis of MD5 Compress, May 2, 1996.
Hans Dobbertin, "The Status of MD5 After a Recent Attack", RSA Laboratories; CryptoBytes, 1996.
U.S. Department of Commerce, National Institute of Standards and Technology, "Secure Hash Standard", FIPS PUP 180-1, Apr. 17, 1995. (24 pages).
International Preliminary Report on Patentability and the Written Opinion issued in PCT/US2010/028562; dated Oct. 6, 2011; (15 pages).
International Preliminary Report on Patentability and the Written Opinion issued in PCT/US2010/028565 dated Oct. 6, 2011; (16 pages).
International Preliminary Report on Patentability and the Written Opinion issued in PCT/US2010/028582; dated Oct. 6, 2011; (8 pages).
International Preliminary Report on Patentability and the Written Opinion issued in PCT/US2010/028583; dated Oct. 6, 2011; (9 pages).
International Preliminary Report on Patentability and the Written Opinion issued in PCT/US2010/028566; dated Oct. 6, 2011; (7 pages).
International Search Report and the Written Opinion issued in PCT/US2010/028566; dated Dec. 30, 2010; (10 pages).
International Search Report and the Written Opinion issued in PCT/US2010/028565; dated Oct. 6, 2010; (24 pages).
International Search Report and the Written Opinion issued in PCT/US2010/028562; date Sep. 29, 2010; (24 pages).
Barrett, Daniel and Sliverman, Richard, "SSH, The Secure Shell: The Definitive Guide, 2nd Edition", O'Reilly Media, Section 2.4, Section 3.3, Section 3.4, Section 6.1-6.7. May 1, 2005.
Ehrsam, W.F. et al., A Cryptographic Key Management Scheme for Implementing the Data Encryption Standard, IBM Sys. J., vol. 17 No. 2, 1978.
Cheng, P. et al., Modular Key Management Protocol (MKMP), Nov. 28, 1994.
RSA Laboratories, PKCS #5 v2.0: PAssword-Based Cryptography Standard, Mar. 25, 1999.
M. Fischer v. Mollard et al.; "Gnu Privacy Guard (GnuPG) Mini Howto"; retrieved from the Internet: http://www.gnupg.org/documentation/howtos.en.html, version 0.1.4; Aug. 10, 2004 (14 pages).
Office Action issued in corresponding U.S. Appl. No. 13/203,368, dated May 21, 2015 (17 pages).
Decker et al.; "The SumoDacs-project: Secure Mobile Data Access with a Tamperproof Hardware Token"; eChallenges e-2010 Conference Proceedings, IIMC; 2010 (8 pages).
Gunson et al.; "User Perceptions of Security and Usability of Single-Factor and Two-Factor Authentication in Automated Telephone Banking"; Computers & Security (2011), vol. 30, No. 4; pp. 208-220 (13 pages).
Javinen et al.; "Embedded SFE: Offloading Server and Network Using Hardware Tokens"; Financial Cryptography and Data Security Proceeding, 14th International Conference, FC 2010; Tenerife, Canary Islands, Jan. 25-28, 2010 (15 pages).
Kaya (2003). Secure multicast groups on ad hoc networks. SASN '03 Proceedings of the 1st ACM Workshop on Security of ad hoc and sensor networks, pp. 94-102.
Lin et al.; "A Practical Electronic Payment System for Message Delivery Service in the Mobile Environment"; Wireless Personal Communications, vol. 42, No. 2; pp. 247-261; Jul. 2007 (15 pages).
Sun et al.; "A New Design of Wearable Token System for Mobile Device Security"; IEEE Transactions on Consumer Electronics, vol. 54, No. 4; pp. 1784-1789; Nov. 2008 (6 pages).

* cited by examiner

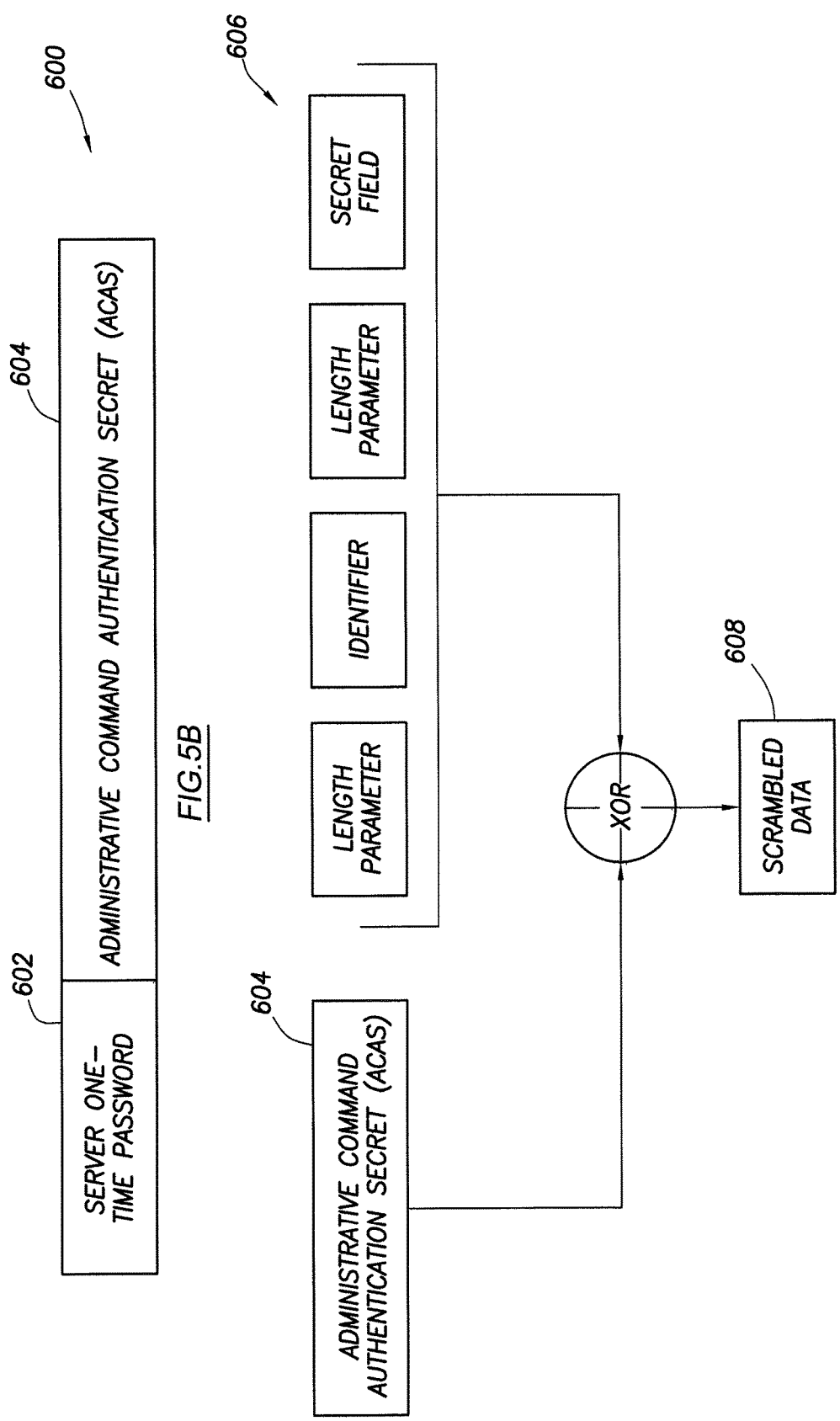

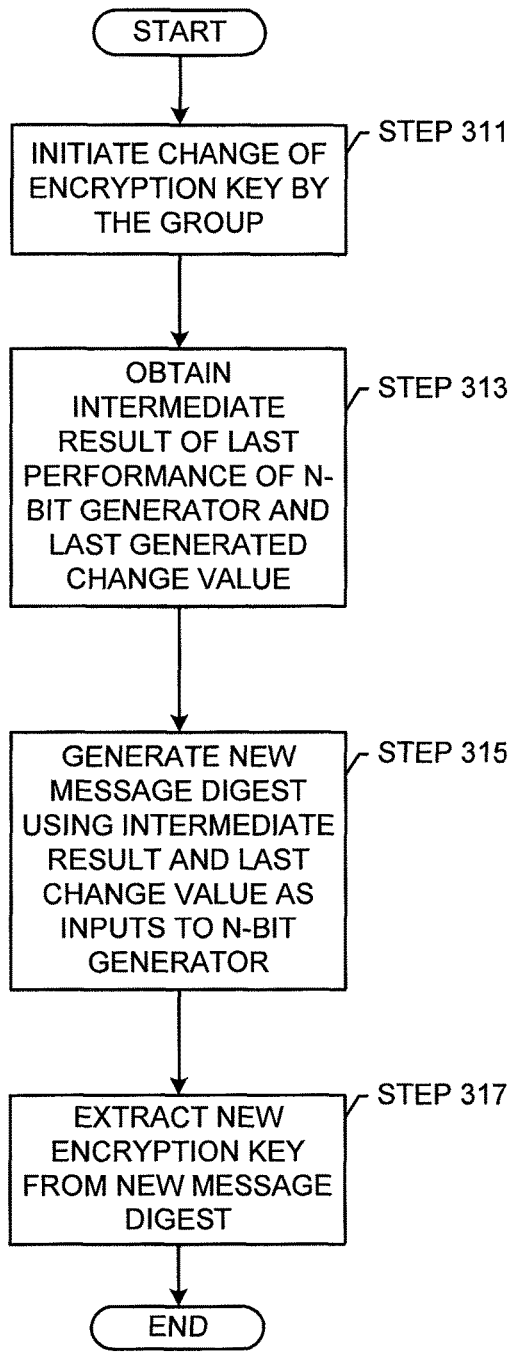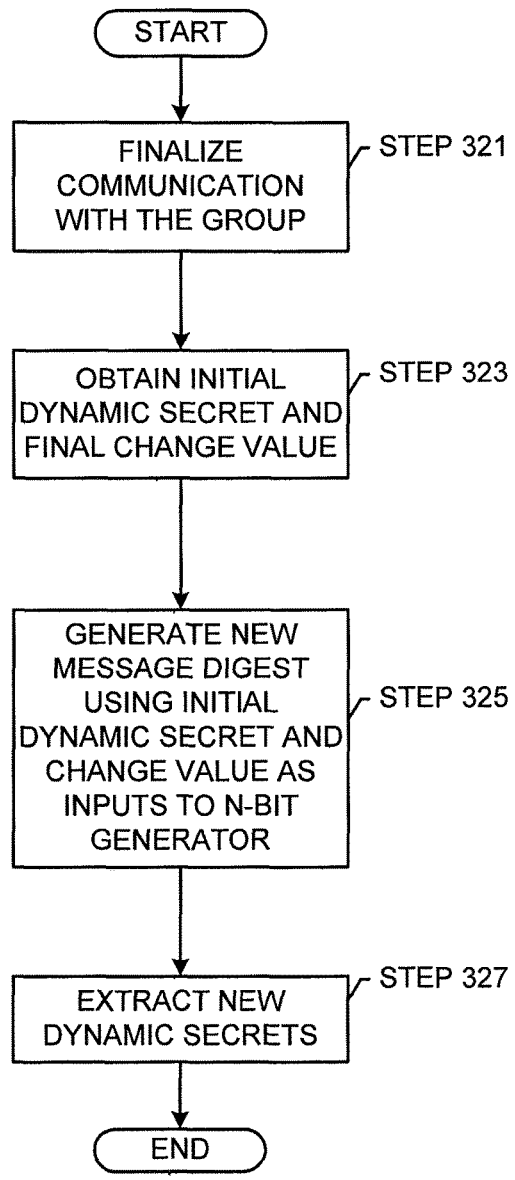
*FIG. 7A*
*FIG. 7B*

000
METHOD AND SYSTEM FOR SECURING COMMUNICATION

CROSS-REFERENCE TO RELATED APPLICATIONS

The present application is a continuation of U.S. application Ser. No. 13/930,846, filed Jun. 28, 2013, now U.S. Pat. No. 9,009,484, which is a continuation of U.S. application Ser. No. 13/203,344, filed Aug. 25, 2011, now U.S. Pat. No. 8,539,241, which is a national stage under 35 USC 371 and claims priority to PCT Application No. PCT/US2010/028565, filed Mar. 25, 2010, which claims the priority benefit of U.S. Provisional Application No. 61/163,414 filed on Mar. 25, 2009 and entitled, "Method and System for a Multi-threaded Algorithm Which Provides Security For Computers, Networks, and Information," and incorporated herein by reference.

BACKGROUND

The computer system assists in managing (e.g., storing, organizing, and communicating) a large amount of information. Some of the information managed by a computer system is confidential. In other words, access to such information is intended to be limited. Traditional protection schemes attempt to prevent unauthorized users from accessing the confidential information by requiring that a user provide authentication credentials, at a predefined entry point, to access an account that includes the confidential information. Protecting only the predefined entry points, however, fails to account for nefarious individuals creating other entry points by exploiting computer system vulnerabilities. For example, knowledge of a user's hardware and software system, system configuration, types of network connections, etc. may be used to create an entry point and gain access to the confidential information.

In order to prevent unauthorized access to the confidential information, the confidential information may be encrypted. Encryption is a process of transforming the clear text confidential information into an encrypted format that is unreadable by anyone or anything that does not possess the decryption key. An encryption algorithm and an encryption key are used to perform the transformation. Encryption technology is classified into two primary technology types: symmetric encryption technology and asymmetric encryption technology. Symmetric encryption technology uses the same encryption key to both encrypt and decrypt information. Asymmetric encryption technology uses a pair of corresponding encryption keys: one encryption key to encrypt data and the other encryption key of the pair to decrypt the data.

SUMMARY

In general, in one aspect, the invention relates to a method, system, and non-transitory computer readable obtaining a secure communication session. A first member computing device receives a first input from a second member computing device via a first communication channel, sends a second input to the second member computing device via a second communication channel, and receives the second input from the second member computing device via the first communication channel. The secure communication session is initiated based on the first input and second input.

Other aspects of the invention will be apparent from the following description and the appended claims.

BRIEF DESCRIPTION OF DRAWINGS

FIGS. 2A-5A show flowcharts in accordance with one or more embodiments of the invention.

FIG. 5B shows an example message digest in accordance with one or more embodiments of the invention.

FIGS. 5C-8 show flowcharts in accordance with one or more embodiments of the invention.

DETAILED DESCRIPTION

Figure 1A:
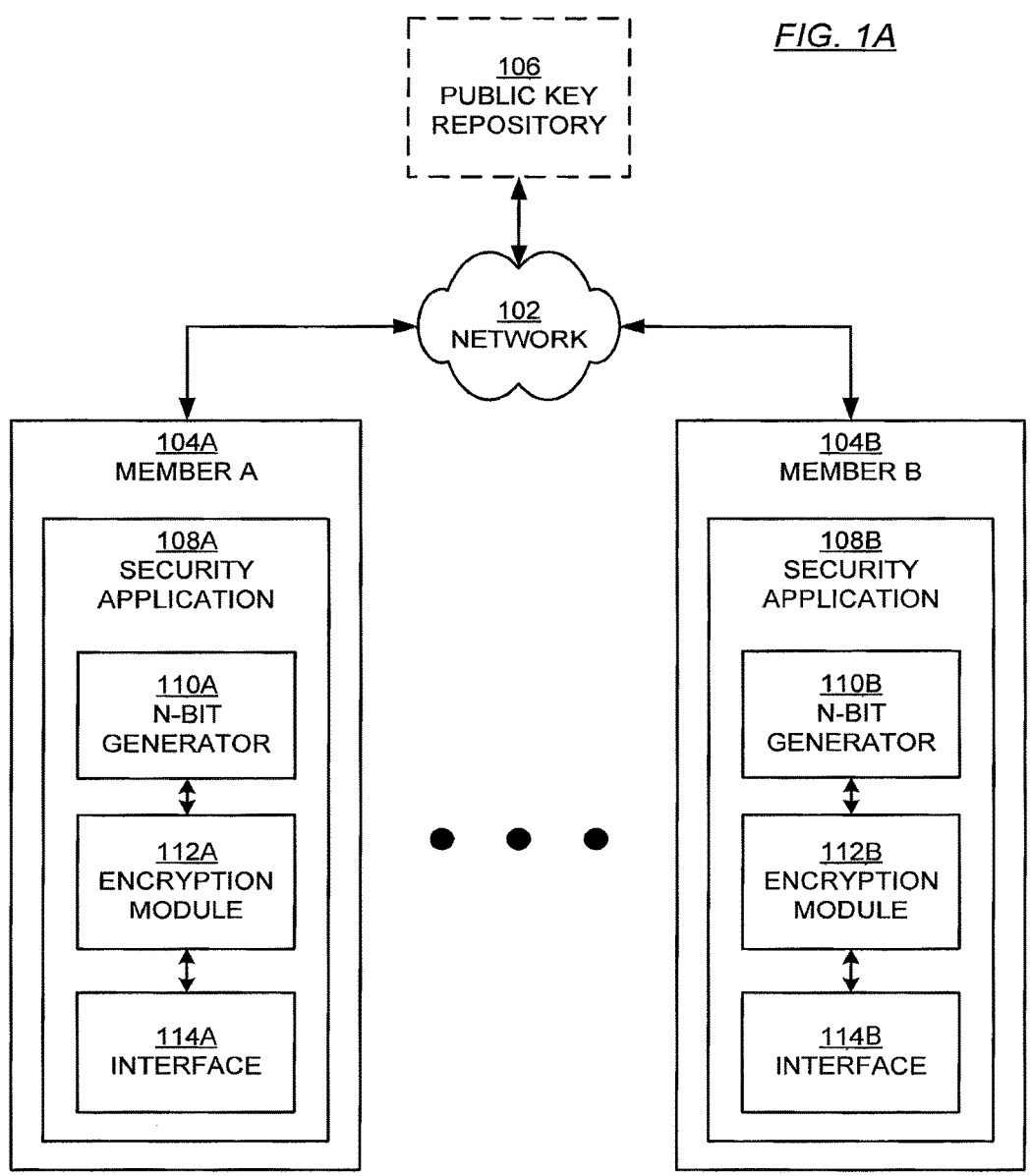
FIGS. 1A-1B show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to securing communication between members of a group, where each member is a computing device. In one or more embodiments of the invention, the group is two or more members that share (or intend to share) confidential information. The confidential information may be transmitted as communication (or portion thereof). Examples of communications include, but are not limited to, short messaging service (SMS) messages, electronic mail (e-mail), chat messages, audio message, graphics, audio-visual messages (e.g., video file, streaming video, etc.). The terms "confidential" and "secret" are used interchangeably in this specification to refer to information, terms, values, or files that are to be protected from unauthorized access and disclosure. Further, as used herein, a communication is encrypted when at least a portion of the communication is encrypted.

In one embodiment of the invention, a computing device is any physical or virtual device that may be used to perform embodiments of the invention. The physical device may correspond to any physical system with functionality to implement one or more embodiments of the invention. For example, the physical device may be implemented on a general purpose computing device (i.e., a device with a processor(s) and an operating system) such as, but not limited to, a desktop computer, a laptop computer, a gaming console, a mobile device (e.g., smart phone, a personal digital assistant, gaming device).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that includes both a general purpose processor(s) and an application-specific processor(s)/hardware. In such cases, one or more portions of the invention may be implemented using the operating system and general purpose processor(s) and one or more portions of the invention may be implemented using the application-specific processor(s)/hardware.

The virtual device may correspond to a virtual machine. Broadly speaking, the virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. The invention is not limited to the aforementioned exemplary architectures. VMware® is a registered trademark of VMware, Inc. Xen® is a trademark overseen by the Xen Project Advisory Board.

Each of the members may be used by, for example, an individual, a business entity, a family, any other entity, or any combination thereof. For example, a group may have as members, John Smith's computing device and Jane Doe's computing device. As another example, a group may have as members, John Smith's smart phone, John Smith's personal computer, and John Smith's gaming console. As another example, a group may have members John Smith's computing device, Jane Smith's computing device, and the servers of the Smith's financial advisors. Other possible groups may exist without departing from the scope of the invention.

In one or more embodiments of the invention, each member sends an input to each other member of the group. After receiving the inputs from the other members, each member individually creates an initial message digest by using the inputs in an n-bit generator. The n-bit generator produces a deterministic result. Specifically, the output of the n-bit generator is the same when the same inputs are used. Because all members of the group use the same inputs and have n-bit generators that perform the same operations, the resulting message digest is the same for all members of the group. Continuing with the discussion, the initial message digest may include an encryption key or may be used to create an encryption key. Thus, members of the group are able to independently create the same encryption key for securing communication between members of the group.

Figure 1B:
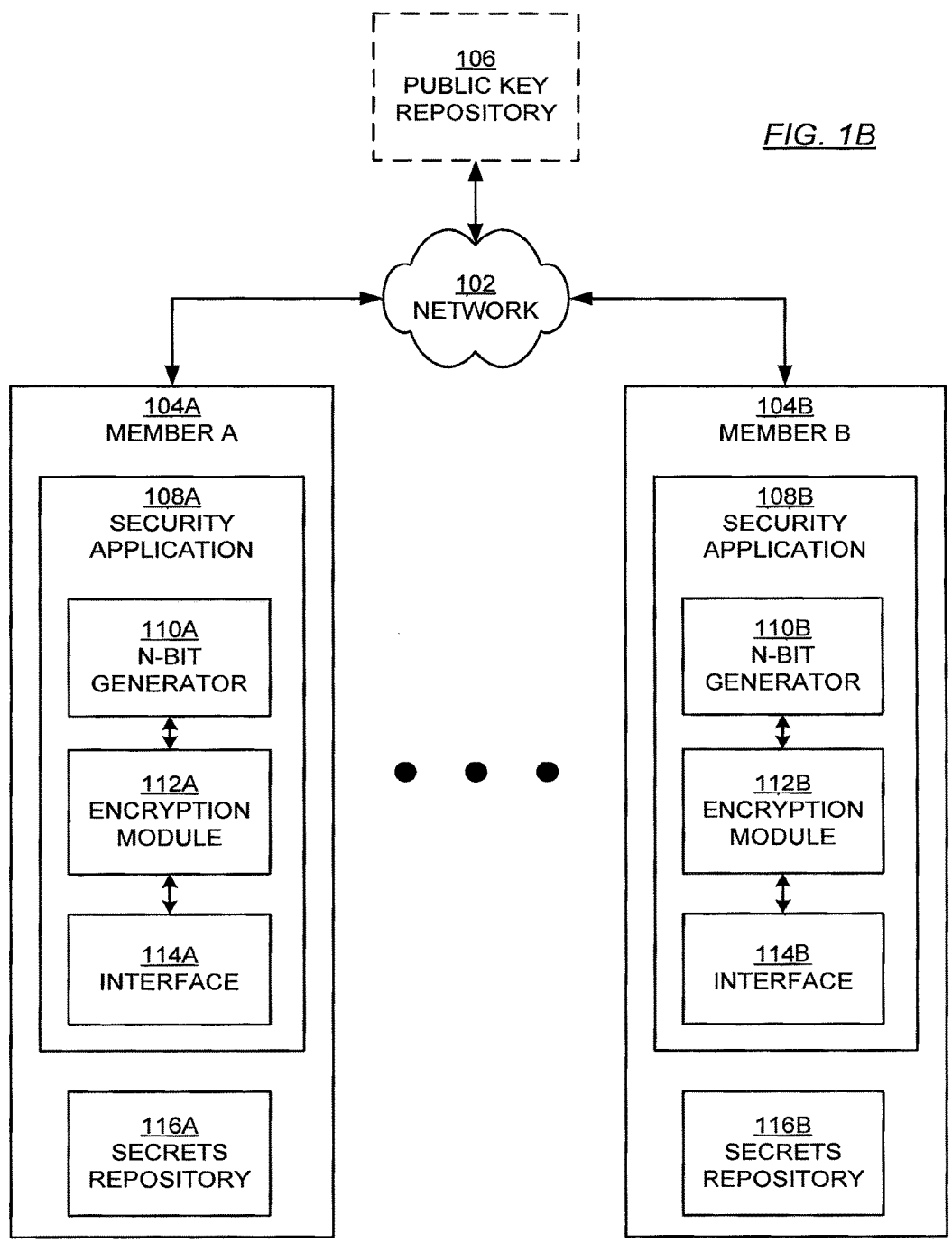

FIGS. 1A-1B show schematic diagrams in accordance with one or more embodiments of the invention. As shown in FIG. 1A, the system includes a network (102), members (e.g., 104A, 104B), and, optionally, a public key repository (106). Each of these components is described below.

In one or more embodiments of the invention, a network (102) is an interconnection of devices that allow for communication between any two devices within the network. For example, the network (102) may correspond to a local area network (LAN), a wide area network (WAN), such as the Internet, any other type of wired or wireless network, or any combination thereof.

In one or more embodiments of the invention, each member (e.g., 104A, 104B) includes a security application. The security application (e.g., 108A, 108B) on each member (e.g., 104A, 104B) may be instances of the same application, different versions of the same application, or different applications. Further, the security application may correspond to a complete program product or a programming module of another application. For example, the security application may be a part of and provide security for a banking or commerce application. In one or more embodiments of the invention, the security application (e.g., 108A, 108B) includes an n-bit generator (e.g. 110A, 110B), an encryption module (e.g. 112A, 112B), and an interface (e.g. 114A, 114B). Each of the components of the security application (e.g. 108A, 108B) may be implemented in hardware, software, firmware, or a combination thereof. The components of the security application are discussed below.

In one or more embodiments of the invention, an n-bit generator (e.g., 110A, 110B) includes functionality to receive and process one or more inputs to generate a message digest. A message digest is a string of characters, which may be represented as a bit-string, in accordance with one or more embodiments of the invention. In one or more embodiments of the invention, the message digest is a bit string. Further, the n-bit generator includes functionality to generate a deterministic and repeatable message digest, which appears pseudo-random or random, in accordance with one or more embodiments of the invention. A pseudo-random output (e.g., message digest) is output that is repeatable and predictable but appears random. Specifically, in one or more embodiments of the invention, although the message digest is repeatable and calculable when the inputs and the operations performed by the n-bit generator (e.g., 110A, 110B) are known, the message digest appears random. The apparent randomness may be with respect to someone who knows or does not know the inputs in accordance with one or more embodiments of the invention. Alternatively, or additionally, the apparent randomness may be with respect to someone who does not know the operations performed by the n-bit generator in accordance with one or more embodiments of the invention. In one or more embodiments of the invention, the message digest is deterministic in that a single output exists for a given set of inputs. Moreover, the message digest may be a fixed length. In other words, regardless of the input length, the same n-bit generator (e.g., 110A, 110B) may produce a message digest with a fixed length.

The number of bits in the input to the n-bit generator may be different or the same as the number of bits in the output produced by the n-bit generator. For example, if the n-bit generator accepts n number of bits for input and produces m number of bits for output, m may be less than, equal to, or greater than n. Multiple iterations of the n-bit generator may be performed to construct an ever-increasing m-bit result that includes multiple message digests.

Further, the n-bit generator (e.g. 110A, 110B) includes functionality to generate a deterministic message digest. Specifically, the n-bit generator (e.g., 110A, 110B) has the following two properties. First, the n-bit generator (e.g., 110A, 110B) generates the same message digest when provided with the same input(s). Second, the n-bit generator generates, with a high probability, a different message digest when provided with different input(s). For example, a single bit change in the input may result in a significant change of the bits in the resulting message digest. In the example, the change may be fifty percent of the bits depending on the type of n-bit generator used. However, a greater percentage or less percentage of bits may change without departing from the scope of the invention.

The n-bit generator (e.g., 110A, 110B) may include multiple sub-routines, such as a bit shuffler (not shown) and a hash function (not shown). In one or more embodiments of the invention, the bit shuffler includes functionality to combine multiple inputs into a single output. Specifically, the bit shuffler applies a function to the bit level representation of inputs to generate a resulting set of output bits. The output of the bit shuffler may appear as a shuffling of bits in each of inputs and may or may not have the same ratio of 1's to 0's as the input. In one or more embodiments of the invention, the bit shuffling by the bit shuffler has a commutative property. In other words, the order that inputs are provided to the bit shuffler does not affect the output. For example, consider the scenario in which the inputs are input X, input Y, and input Z. Bit shuffling on input X, input Y, and input Z produces the same output as bit shuffling on input Y, input Z, and input X.

In one embodiment of the invention, the bit shuffler may correspond to any function or series of functions for combining inputs. For example, the bit shuffler may correspond to the XOR function, the multiplication function, an addition function, or another function that may be used to combine inputs. As another example, the security application with the bit shuffler may correspond to a function that orders the inputs and then uses a non-commutative function to generate an output. The bit shuffler may correspond to other mechanisms for combining multiple inputs without departing from the scope of the invention.

In one or more embodiments of the invention, a hash function is a function that includes functionality to receive an input and produce a pseudo-random output. In one or more embodiments of the invention, the hash function may include functionality to convert a variable length input into a fixed length output. For example, the hash function may correspond to GOST, HAVAL, MD2, MD4, MD5, PANAMA, SNEERU, a member of the RIPEMD family of hash functions, a member of the SHA family of hash functions, Tiger, Whirlpool, S-Box, P-Box, any other hash function, or any combination thereof.

Although the above description discusses the use of the bit shuffler prior to the hash function, in one or more embodiments of the invention, the hash function operations may be performed prior to the bit shuffler operations. For example, the hash function may be performed separately on each of the inputs to create hashed inputs. The hashed inputs may then be combined by the bit shuffler. Alternatively, the bit shuffler may be first performed on the inputs to create a single intermediate result before the intermediate result is provided to the hash function. The intermediate result may be stored to be used later to create subsequent message digests.

In one or more embodiments of the invention, the n-bit generator (e.g., 110A, 110B) is operatively connected to an encryption module (e.g., 112A, 112B). The encryption module (e.g., 112A, 112B) includes functionality to manage the encryption and decryption of information for the member (e.g., 104A, 104B). For example, the encryption module may include functionality to receive information, request one or more message digests from the n-bit generator (e.g., 110A, 110B), extract an encryption key from the one or more message digests, and encrypt the information using the encryption key. Alternatively, or additionally, the encryption module (e.g., 112A, 112B) may include functionality to receive encrypted information, request one or more message digests from the n-bit generator (e.g., 110A, 110B), extract an encryption key from the one or more message digests, and decrypt the encrypted information using the encryption key.

In one or more embodiments of the invention, the encryption module (e.g., 112A, 112B) is identically configured across all members of a group to request the same number of message digests. The configuration may be based, for example, on the type of communication, the encryption algorithm, and/or the type of data to be extracted from the message digest.

The encryption module (e.g., 112A, 112B) implements one or more encryption algorithms. In one or more embodiments of the invention, the encryption algorithm includes functionality to transform information from a clear text format into an encrypted format that is unreadable by anyone or anything that does not possess a corresponding encryption key. For example, the encryption algorithm may correspond to Data Encryption Algorithm (DEA) specified in the Data Encryption Standard (DES), Triple DES, Advanced Encryption Standard (AES), FEAL, SKIPJACK, any other encryption algorithm, or any combination thereof. In one or more embodiments of the invention, the encryption module implements only symmetric encryption algorithm(s).

Although not shown in FIG. 1A, the encryption module (e.g., 112A, 112B) may also include or be operatively connected to an algorithm selector table (not shown). An algorithm selector table is a logical association between encryption algorithms and an algorithm identifier. The algorithm identifier may be, for example, a numeric, binary, or another such value. In one or more embodiments of the invention, all algorithm identifiers in a range are present. For example, the algorithm identifier may be a range of integers (e.g., 0 . . . 15), a sequence of binary values (e.g., 000, 001, 010, . . . 111). Further, the same encryption algorithm may be associated with multiple algorithm identifiers in the table. For example, "0" may correspond to AES, "1" may correspond to Triple DES, "2" may correspond FEAL, and "3" may correspond to Triple DES.

Further, in one or more embodiments of the invention, the association between the encryption algorithm identifiers and the encryption algorithms is not based on a pre-defined ordering of encryption algorithms. Specifically, the association may be randomly defined.

The use of the term, "table", is only to denote a logical representation; various implementations of the algorithm selector table may be used without departing from the scope of the invention. For example, the algorithm selector table may be implemented in computer instructions using a series of conditional statements. Specifically, when a conditional statement is satisfied, the code corresponding to the implementation of the encryption algorithm is executed. By way of another example, the algorithm selector table may be implemented as a data structure that associates the consecutive encryption algorithm identifiers with identifiers used by the security application for each of the encryption algorithms. The above are only a few examples of possible implementations for the algorithm selector table and not intended to limit the scope of the invention.

Further, all members associate the same encryption algorithm identifiers with the same corresponding encryption algorithms. For example, if one member associates "0" with AES, "1" with Triple DES, "2" with FEAL, and "3" with Triple DES, then the remaining members associates "0" with AES, "1" with Triple DES, "2" with FEAL, and "3" with Triple DES. Further, all members may or may not use the same implementation of a algorithm selector table.

In one or more embodiments of the invention, the algorithm selector table includes separate entries for each encryption algorithm and key length pair. In one or more embodiments of the invention, the encryption module may identify the encryption algorithm from the algorithm selector table and use the key length associated with the encryption algorithm to extract the appropriate number of bits for the encryption key. For example, an entry may exist for Blowfish with an encryption key length 256 bits and a separate entry may exist for Blowfish with an encryption key length of 384 bits. In the example, if the first entry is specified in the algorithm selector bits of the message digest (discussed below), then 256 bits are extracted from the message digest(s) for the encryption key. Alternatively, in the example, if the second entry is specified, then 384 bits are extracted from the message digest for the encryption key.

Further, each entry in the algorithm selector table may include a starting bit value. The starting bit value may be used to identify a first secret to use in the secrets repository or a starting bit for the encryption key in the message digest.

Alternatively, although not shown in FIG. 1A-1B, the system may include a key length table. The key length table may specify an identifier with a corresponding encryption key length. Similar to the algorithm selector table, multiple different possible implementations of the key length table may be used without departing from the scope of the invention. Further, all members of the group have the associations between key length identifiers and key lengths, but may not have the same implementation of key length table. For example, "1" may be associated with "256 bits", 2 may be associated with "128 bits", etc.

In one or more embodiments of the invention, when a key length table is used, the algorithm selector table may be used to specify the encryption algorithm, and the key length table may be used to specify the number of bits in the encryption key. Specifically, a key length field (discussed below) in the message digest may index the corresponding entry in the key length table. In one or more embodiments of the invention, if the specified encryption algorithm does not allow for variable key length, then the key length field in the message digest is ignored.

Continuing with the discussion of the security application (e.g., 108A, 108B), in one or more embodiments of the invention, the interface (e.g., 114A, 114B) includes functionality to connect to entities that are not a part of the security application (e.g., 108A, 108B). For example, the interface (e.g., 114A, 114B) may correspond to an application programming interface (API) and/or a user interface. The security application may be configured to communicate with other applications executing on the same or different computing devices using the API. Thus, for example, the API of member A's security application (108A) may include functionality to communicate via the network with member B's security application (108B). As another example, the API may include functionality to receive an encrypted format of a file and provide a clear text format of the file to another application executing on member A (e.g., 104A, 104B). Conversely, the API may include functionality to receive, from another application on member A (108A), a clear text format of a file and provide an encrypted format of the file to another application executing on member A (108A).

In one or more embodiments of the invention, the user interface includes functionality to communicate with a user of the member (e.g., 104A, 104B). Specifically, the user interface includes functionality to receive input from the user and/or provide information to the user. The user interface may include hardware and/or software components, such as information boxes, menu buttons, drop down boxes, input boxes, hardware lights, hardware buttons, and/or other user interface components.

Continuing with FIG. 1A, the public key repository (106) is an authority that binds a member's identity with a public key. For example, the public key repository (106) may correspond to the public key infrastructure (PKI) (e.g., certificate authority, registration authority, directories, and/or any other components of a PKI). Specifically, one or more of the members of the group may additionally implement asymmetric encryption. In asymmetric encryption, the information is encrypted with the public (encryption) key of the member and can only be decrypted with the private (encryption) key of the member. Similarly, the information is encrypted with the private (encryption) key of the member and can only be decrypted with the public (encryption) key of the member. The public key is publically available and associated with the member's identifier in the public key repository (106). The private key is kept secure by the member and is known only to the member. The public key repository (106) includes functionality to receive a request having a member identity, and provide the member's public key in response to the request.

As another example, the public key repository (106) may be a trusted introducer (Intermediate). Specifically, the Intermediate may be a member who is known to other members and could be used to securely provide a secret seed to members not previously known to each other. In the example, the Intermediate may securely communicate secret seeds to each of the members previously not known to each other but known to the Intermediate. Thus, the Intermediate may introduce members to each other.

Although FIG. 1A shows all components of the security application (e.g., 108A, 108B) as located on the member (e.g., 104A, 104B), at least a portion of the security application (e.g., 108A, 108B) may be remote from the member (e.g., 104A, 104B). For example, a portion of the security application may be stored on an external storage device. As another example, an external device that is connected to the member may be configured to process and display a user interface for the security application (e.g., 108A, 108B) executing on the member.

FIG. 1B shows a schematic diagram of a system in accordance with one or more embodiments of the invention. As shown in FIG. 1B, many of the components of FIG. 1B are the same as FIG. 1A. However, as shown in FIG. 1B, each of the members (e.g., 104A, 104B) may include a secrets repository (e.g., 116A, 116B). In one or more embodiments of the invention, the secrets repository (e.g., 116A, 116B) is any type of storage unit and/or device (e.g., a file system, file, collection of files, database, collection of tables, external data store (e.g., a USB drive, etc.) or any other storage mechanism) for storing secrets. Further, the secrets repository (e.g., 116A, 116B) may include multiple different storage units and/or devices.

Secrets in the secrets repository (e.g., 116A, 116B) correspond to data known only to the members of the group. Further, each member of the group may independently generate the secrets using an n-bit generator (e.g., 110A, 110B). Thus, the secrets may correspond to one or more message digests, or a portion thereof. Generating the secrets is discussed below and in FIGS. 2A-7B.

Secrets in the secrets repository (e.g., 116A, 116B) are each associated with a given group and may be further organized according to type of communication in accordance with one or more embodiments of the invention. For example, secrets used for encryption in a chat session may be different than secrets used for encryption in an email communication. Alternatively or additionally, the secrets may be organized based on the clear text file format of a file to be encrypted. For example, secrets used to encrypt portable document formatted (PDF) files may be different than secrets used to encrypt extensible markup language (XML) files.

In one or more embodiments of the invention, each secret is a shared secret. A shared secret may include a static secret, a dynamic secret, or both a static and a dynamic secret. The static secret may remain unchanged throughout the lifetime of the group in accordance with one or more embodiments of the invention. For example, the static secret may be used to recover secure communications by providing new shared secrets or a new encryption key when the members of the group lose synchronization with regards to the dynamic secrets. In contrast, the dynamic secret may periodically change, such as at the end of each communication session or prior to beginning a communication session or at predefined boundaries during a communication session.

In one or more embodiments of the invention, a communication session may be a set of related communications (e.g., related short messaging service messages (SMS), related emails, chat messages, or other related communications). Alternatively, or additionally, a communication session may correspond to a set of communications starting at a first time and having a duration of a pre-defined amount of time. The pre-defined amount of time may be defined, for example, according to the amount of time after the last communication is sent and/or received.

FIGS. 2A-8 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 2A:
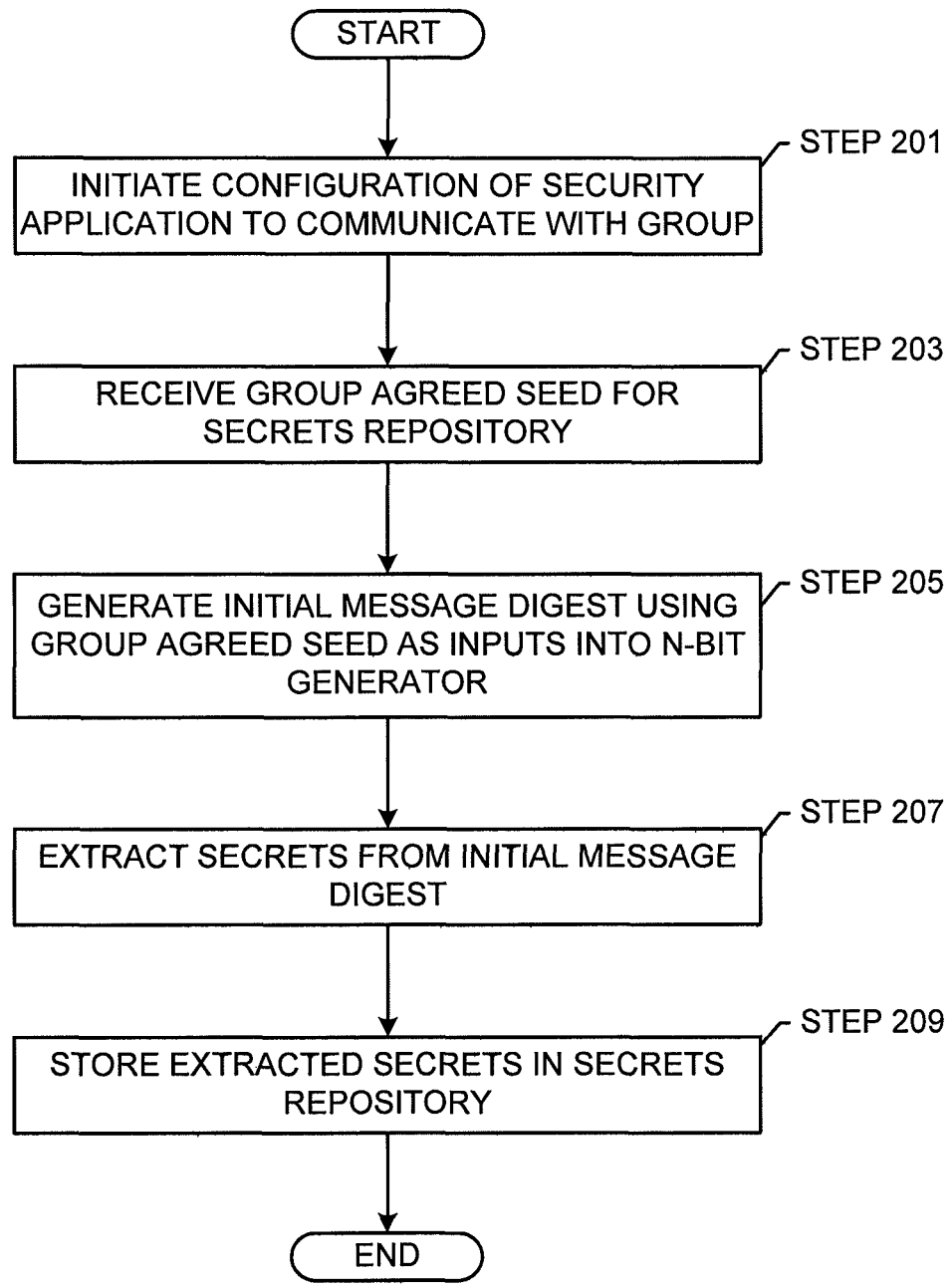
Figure 2B:
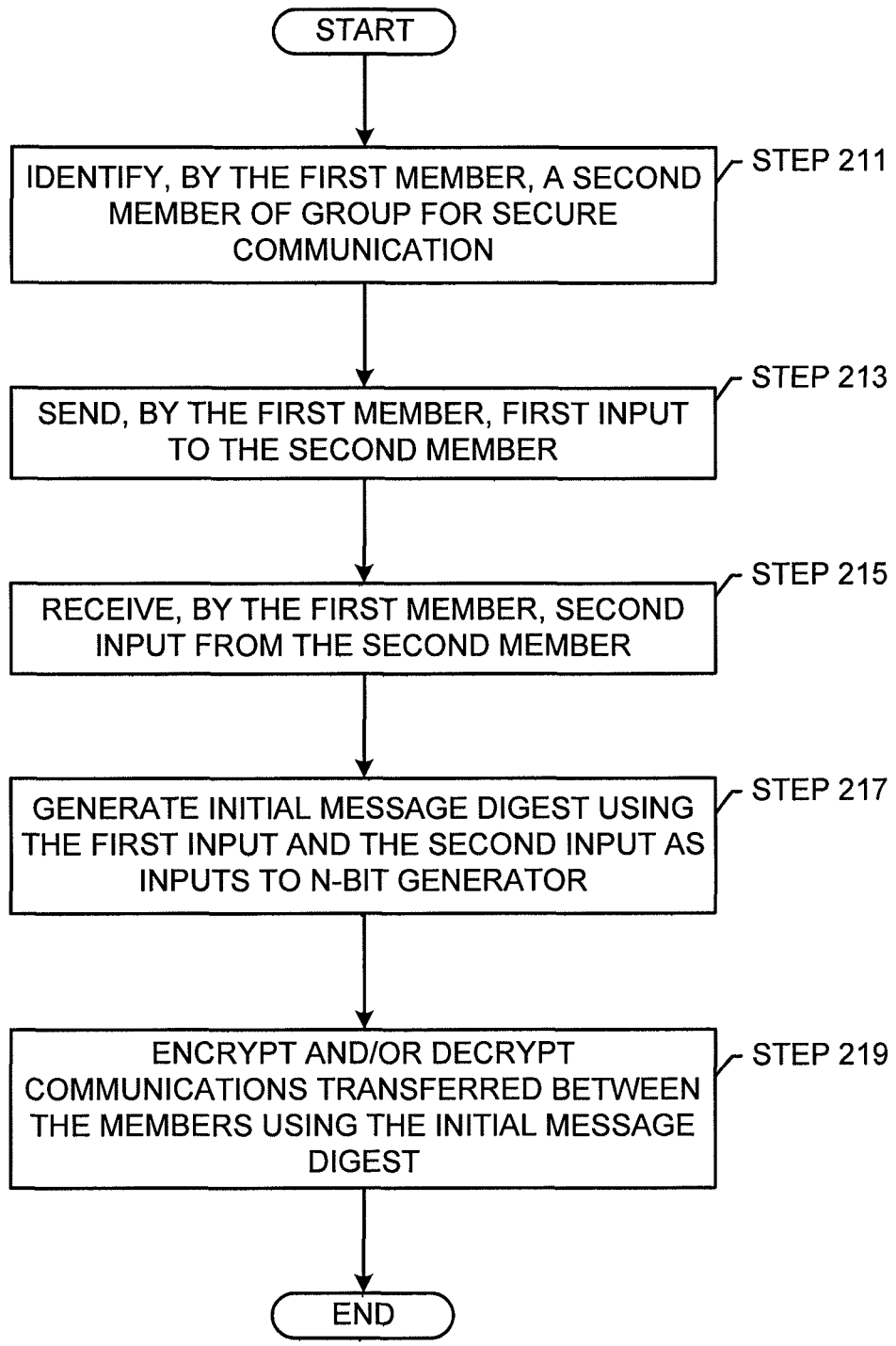
Figure 3A:
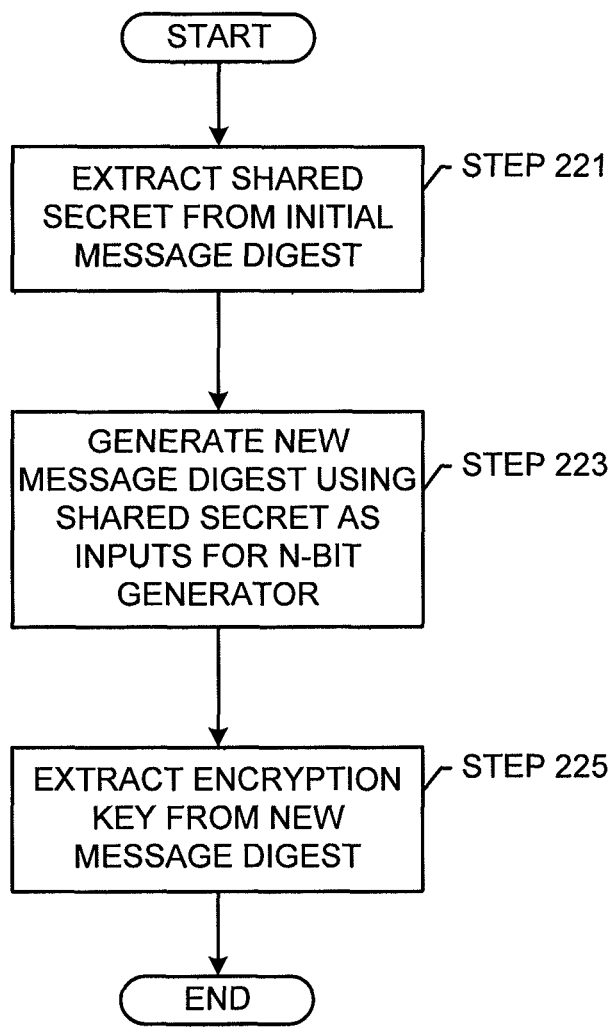
Figure 3B:
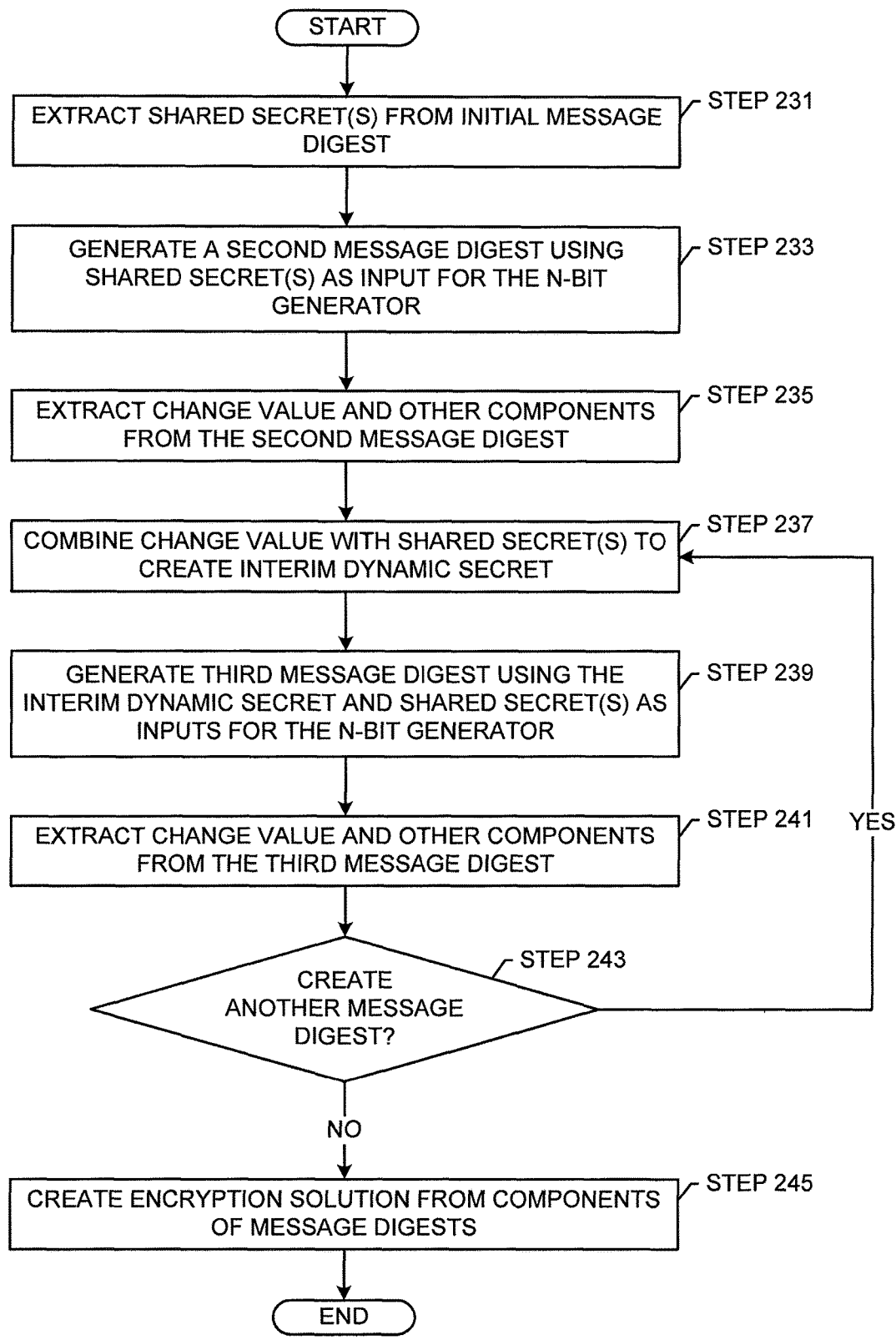
Figure 4:
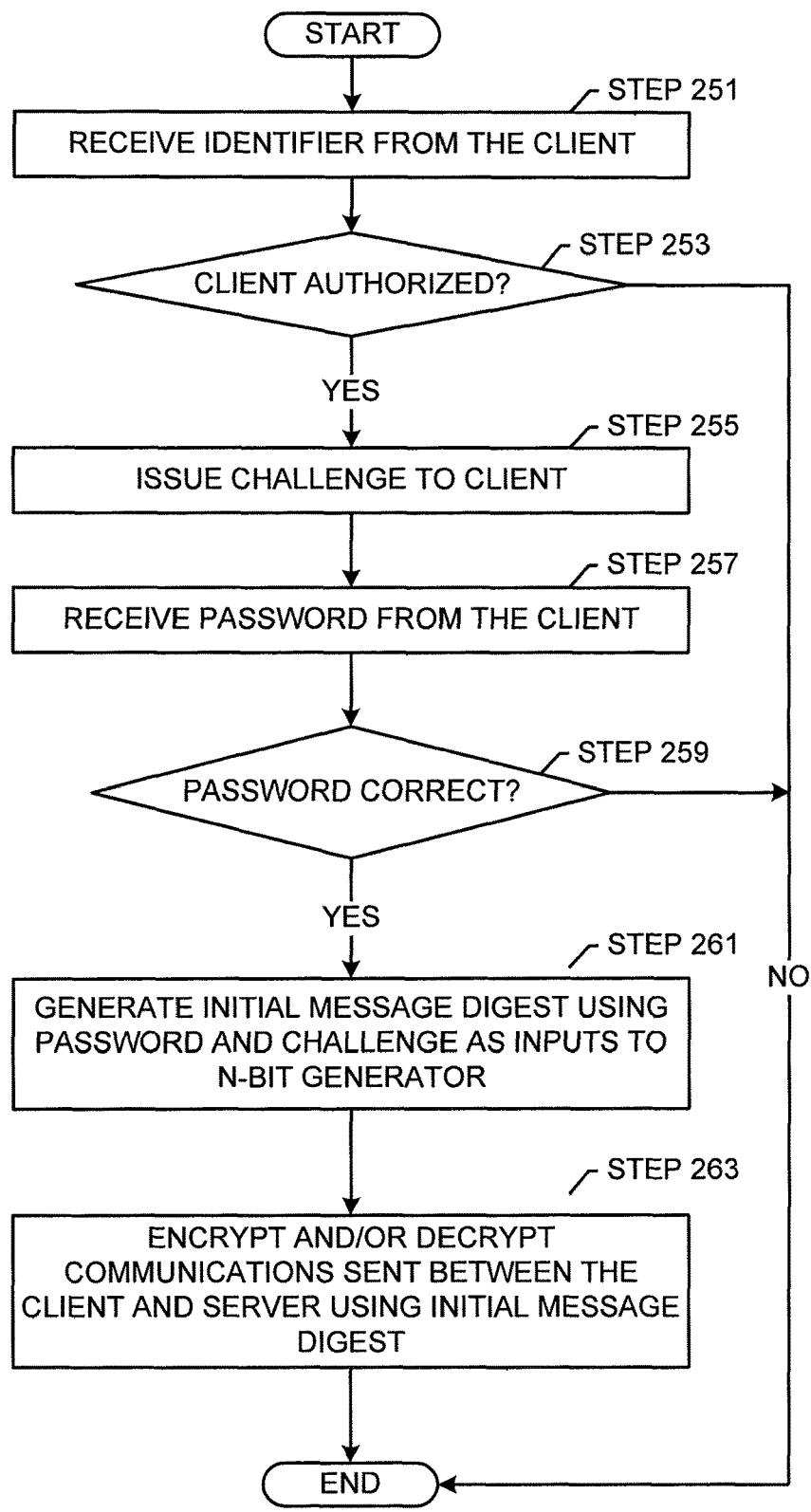
Figure 8:
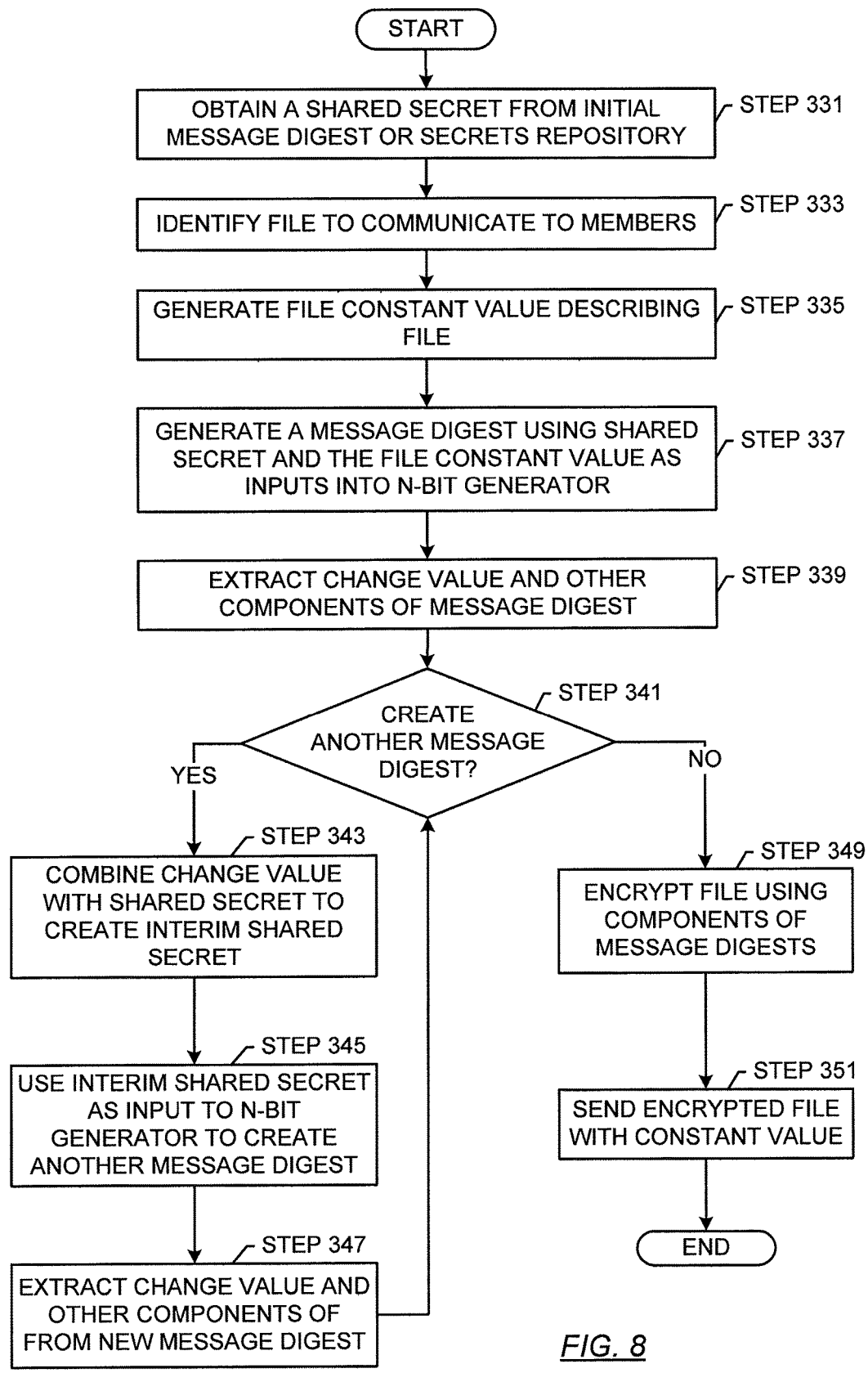

Specifically, FIG. 2A shows a flowchart for creating an initial message digest using a group agreed seed in accordance with one or more embodiments of the invention. FIG. 2B shows a flowchart for creating an initial message digest based on inputs that each member sends and receives. FIGS. 3A and 3B show flowcharts for using the initial message digest. FIG. 4 shows an example of creating an initial message digest in a client server system in accordance with one or more embodiments of the invention. FIG. 5A-5E show flowcharts and a diagram for a client to authenticate the server in the client server system. FIG. 6 shows an example for a group where each member provides input for a first message digest. FIGS. 7A and 7B show flowcharts to generate new encryption keys. FIG. 8 shows a flowchart to encrypt a file in accordance with one or more embodiments of the invention. Each of these flowcharts are discussed below.

Referring to FIG. 2A, in Step 201, the configuration of the security application is initiated for communication with the group. In one or more embodiments of the invention, a user of the computing device may initiate the configuration of the security application by opening the security application, providing the user's credentials (e.g., user name and password and/or other authentication credentials), and submitting information about members of the group. For example, the information submitted may include each user's name, nickname, contact information, and/or secure communication channel information for communicating with the member(s). Rather than a user initializing configuration of the security application, the security application may be remotely configured. For example, consider the scenario in which the group includes a bank computing device and a device of the user having an account at the bank. The member may be remotely initialized by the bank computing device. Alternatively, the computing device of the user may start the initialization of its security application and then turn control over to the bank computing device to complete the initialization, such as if the member is temporarily directly connected to the bank computing device. In such a scenario, initialization, the member may be removed from the bank computing device and provided to a user for remote communication.

In Step 203, a group agreed seed is obtained. Specifically, the members of the group and/or their corresponding users communicate and agree on a group agreed seed. If the users communicate and agree on the group agreed seed, then the user may submit the group agreed seed to the security application. In such embodiments, the security application obtains the group agreed seed from the member. If the members communicate with the other members regarding the group agreed seed, then the member obtains the group agreed seed as the one agreed upon. The group agreed seed may be any password, passphrase, or series of characters. For example, the group agreed seed may be "the cow jumped over the moon," "#8$#DsaVA(@12w@," or any other collection of characters (e.g., symbols and/or alphanumeric characters). Users of the members (or a program executing on the members) may communicate the group agreed seed in person, over the phone, via postal mail, or using any other alternative communication channel. Each member may independently submit the group agreed seed to the security application. When prompted, the user of each member may enter the group agreed seed in a field of the user interface of the security application. Alternatively, a process executing on the member may provide the group agreed seed to the security application. For example, the process may provide the group agreed seed when the group needs to resynchronize the shared secrets.

In Step 205, an initial message digest is generated using the group agreed seed as input(s) to the n-bit generator. Specifically, the encryption module calls the instance of the n-bit generator in the security application using the group agreed seed as the input value.

In Step 207, secrets are extracted from the initial message digest. Specifically, the encryption module identifies each portion of the message digest relating to a secret. The following examples are not intended to limit the scope of the invention. Turning to an example, in a 512-bit message digest, bits in bit positions 0-127 may correspond to the static secret, bits in bit positions corresponding to 128-383 may correspond to the dynamic secret and the final 128 bits may correspond to discard bits that remain unused. In the example, the security application extracts the static secret by obtaining the first 128 bits of the message digest and extracts the dynamic secret by obtaining the next 256 bits. As discussed, the above is only an example. For example, the ordering of the static secrets, dynamic secret, and discard bits may be different from the previous example, the discard bits may be omitted, the static secret or a portion thereof may be in different message digests, the dynamic secret or a portion thereof may be in different message digests, or one of the secrets may be omitted. In one or more embodiments of the invention, each security application extracts the same bits for each of the secrets. Thus, each member of the group generates the same set of secrets.

As another example for extracting secrets, bits in the message digest may indicate the starting position of each of the secrets. For example, the first four bits low order or least significant of the message digest may be used as shift bits defining the start of a secret. In such an example, the first bit of a secret may start following the shift value. By way of an example, if the shift bits in the message digest is "0001" (or one in base 10), then the secret starts at bit position two. As another example, if the shift bits is "1000" (or eight in base 10), the secret starts a bit 9.

Additional secrets may be generated for the group by repeating Steps 205 and 207 using the initial message digest and subsequent message digests as an input to the n-bit generator. Alternatively, or additionally, Steps 205 and 207 may be repeated multiple times to generate new secrets. For example, each subsequent time may use, as input, the message digest from the previously time. Alternatively, or additionally, additional secrets may be generated by repeating Steps 203-205 in which new group agreed seeds are used.

In Step 209, the extracted secrets are stored in the secrets repository. In one or more embodiments of the invention, when the extracted secrets are stored, the extracted secrets are associated with the group. For example, extracted secrets for the same group may be stored in the file within the appropriate secrets repository. As another example, extracted secrets for the same group may be associated with a unique group identifier. Further, in one or more embodiments of the invention, the security application associates a secret identifier with each of the secrets. The secret identifier associated with the same secret is identical across all members of the group. For example, the secret identifier may be a sequential numeric identifier designating the order in which the particular secret(s) was generated in relation to other secrets. In the example, the first generated secrets may be associated with one, the second generated secrets may be associated with two, etc.

Additionally, the security applications for all members of the group may be configured to associate the same secrets with the same type of communications and/or the same types of applications. For example, the security applications may be configured to associate the first four generated secrets with email communications, the next six generated secrets with video conferencing applications, etc.

After storing the secrets in the secrets repository, the secrets may be used to create an encryption key for encrypting communications. Generating encryption keys for encrypting communications is discussed in FIGS. 3A and 3B below. Further, because all members of the group generate the same secrets, the resulting encryption keys are identical across all members of the group in accordance with one or more embodiments of the invention.

FIG. 2B shows a flowchart for generating an initial message digest by each member of the group providing input. In one or more embodiments of the invention, the members of the group do not have shared secrets prior to performing the flowchart discussed below. Although FIG. 2B is shown and discussed below from the prospective of one of the members of the group, the steps discussed below are performed by each member of the group so that all members generate the same initial message digest. Further, although FIG. 2B shows an example of a two member group, additional members may be added without departing from the scope of the invention.

In Step 211, a first member of the group identifies a second member of the group. Specifically, a member of the group commences communication with the group. Below are a few examples of how communication may be commenced amongst the members of the group.

In a first example, the security application executing on a first member may receive a request from a user to contact the second member of the group. The request may include a nickname if information about the second member is pre-initialized in the security application. Alternatively, the request may include the user of the second member's name, nickname, contact information, the member's identity with the public key repository, the member's public key and/or secure communication channel information for communicating with the second member.

In another example, the first member's security application may receive a request for connection from the second member's security application based on a request of a user of the second member. In response, with or without input from the user of the first member, the first member's security application may initiate communication with the second member's security application.

In Step 213, the first member of the group sends a first input to the second member of the group. The first input may be a non-deterministic randomly generated challenge, a passphrase, or another piece of data. Further, if the second member has a public key, the first member may verify or obtain the public key from the public key repository and encrypt the first input with the public key. Alternatively, the first input may be sent in clear text. Although not shown in FIG. 2B, the first member sends the same first input to each member of the group.

In Step 215, the first member of the group receives the second input from the second member. If the first member has a public key, then the second input may be in an encrypted format. The first member may decrypt the second input using the first member's private key.

In Step 217, an initial message digest is generated by the first member and the second member using the first input and the second input as inputs to the n-bit generator. Specifically, the encryption module calls the n-bit generator with the first input and the second input. Because both the first member and the second member each use the first input and the second input on the same instance of the n-bit generator, the resulting initial message digest is the same for the first member and the second member.

As discussed above, the steps may be performed by the security application with or without input from a user. For example, the encryption module of the security application may receive the second input and decrypt the second input autonomously. Thus, the encryption module may perform the aforementioned steps without notification or requiring input to/from a user.

In Step 219, communications between the members are encrypted and decrypted using the initial message digest. The communication may include, for example, files, entire messages, attachments, or any other data sent between the members of the group. Encrypting and decrypting communications may be performed by generating an encryption key from the initial message digest as discussed below and in FIGS. 3A and 3B.

Figure 9:
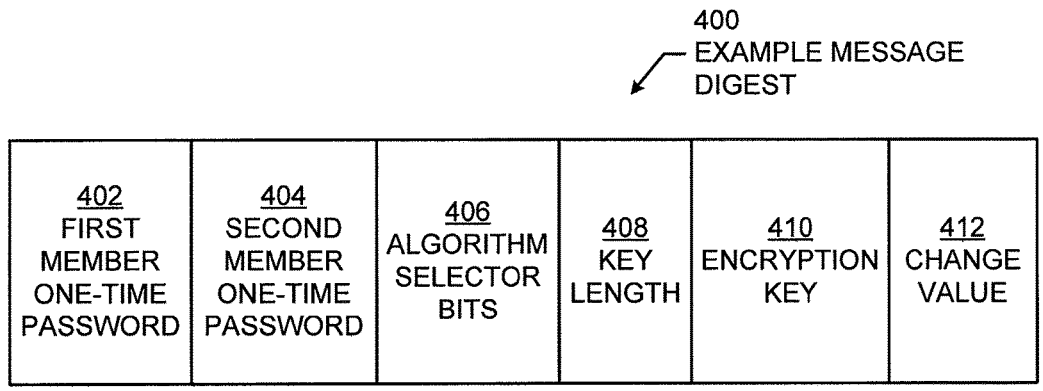
FIGS. 9-10 show example partitioning of a message digest into constituent values in accordance with one or more embodiments of the invention.

Alternatively, an encryption key may be extracted directly from the initial message digest. For example, the initial message digest may correspond to the message digest shown in the example of FIG. 9. FIG. 9 is for example purposes only and not intended to limit the scope of the invention. As shown in the example of FIG. 9, a message digest (400) may include a first member's one-time password (402), a second member's one-time password (404), algorithm selector bits (406), a key length (408), an encryption key (410), and a change value (412).

The first member's one-time password (402) is a series of bits generated by the n-bit generator for the second member to authenticate the first member. Specifically, because both the first member and the second member generate the same message digest (e.g., example message digest (400)), the first member's one-time password (402) is the same for the first member and the second member. Accordingly, if the first member's one-time password (402) that the first member sends to the second member is identical to the second member's generated first member's one time password, then the second member knows that the first member is authentic. Specifically, the first member knows that the second member received the same input and had an n-bit generator that was capable of performing the same operations. Further, in one or more embodiments, once the first member and second member passwords have been confirmed, an extremely high probability exists that the other corresponding bits of the message digest also match between systems. In one or more embodiments of the invention, prior to sending the one-time passwords, the one-time passwords are encrypted using an encryption algorithm and an encryption key. In such embodiments, the one-time passwords are sent encrypted. The receiver may encrypt their generated one-time password and compare the encrypted generated one-time password with the received one-time password. As an alternative, the receiver may decrypt the received one-time password and then compare the decrypted one-time password with the generated one-time password.

Similarly, the second member's one-time password (404) is a series of bits generated by the n-bit generator for the first member to authenticate the second member. Specifically, the second member sends the second member's one-time password (404) to the first member. If the second member's one-time password (404) that the second member sends to the first member is identical to the first member's generated second member's one-time password, then the first member knows that the second member is authentic. Specifically, the second member knows that the first member received the same input and had an n-bit generator that was capable of performing the same operations.

In one or more embodiments of the invention, one-time passwords (e.g., 402, 404) are sent between members after generating the message digest that includes the one-time passwords (e.g., 402, 404) and prior to sending any encrypted confidential information. Thus, all members are authenticated prior to the sending and/or receiving of confidential information in accordance with one or more embodiments of the invention. In one or more embodiments of the invention, one-time passwords are only valid during a single communication session. For each new communication session, new one-time passwords are generated and subsequently used to authenticate the members. As an alternative, one-time passwords may only be used during a first communication session. Later communication sessions between members may not use one-time passwords. Additional one-time passwords may be generated to account for additional members of the group without departing from the scope of the invention. The additional one-time passwords may be generated, for example, by generating additional message digests.

Continuing with the example message digest in FIG. 9, algorithm selector bits (406) provide an index value into the algorithm selector table. Specifically, the use of the algorithm selector (406) in the message digest (400) allows for a randomization of the encryption algorithm used to encrypt the communications. Thus, not only may the encryption key change, but the encryption algorithm may also change. In one or more embodiments of the invention, because each group has the same algorithm selector table, generates the same message digest, and uses the same bits in the message digest as the algorithm selector bits, the members of the group all know the algorithm for encrypting and decrypting the communication. Further, each time a message digest having algorithm selector bits is generated, the encryption algorithm may change from the previously generated encryption algorithm. A feature of an intrinsically secure design is that all aspects of the embodiment can be published and publically known except the secrets. In one or more embodiments of the invention, an attacker may know everything but the secrets and is unable to access the confidential information.

The key length (408) specifies the size of the encryption key (410). Specifically, the key length (408) specifies the number of bits in the encryption key (410). In one or more embodiments of the invention, the encryption key (410) has at least a minimum size (e.g., 64 bit minimum, 128 bit minimum, etc.). The encryption key (410) is a key used by the encryption algorithm to encrypt and decrypt one or more communications. Because all members use the same instance of the n-bit generator to generate the message digests, the encryption key generated by each of the members is the same. Thus, the encryption key does not need to be communicated between the members. Moreover, the encryption key may be kept in the security application and not provided through any interface to any user. Thus, users that leave the group remain unaware of the encryption key used to encrypt the data. In one or more embodiments of the invention, the components of the message digest used to encrypt a communication may be referred to as an encryption solution. Such components may include, for example, algorithm selector bits, an encryption key, and a key length. Other embodiments of the invention, may use a fixed encryption key length. In such embodiments, the communication may be encrypted using only the components corresponding to the algorithm selector bits and the encryption key of the fixed length.

In one or more embodiments of the invention, a change value (412) provides a pseudo-random value to create a new message digest (400). For example, the change value may be used to spawn a new encryption key or create a new dynamic secret. Use of the change value is discussed below and in FIG. 3B and FIGS. 7A and 7B. Further, the stored secrets may be inputted to the n-bit generator to spawn temporary use secrets. All of the spawned secrets are used only during a session in accordance with one or more embodiments of the invention. After the session, the spawned secrets are destroyed so as to be no longer accessible or otherwise obtainable through any nefarious methods. Similar to the temporary use secrets, change value is destroyed once combined with the appropriate dynamic secret.

Returning to the example message digest (400), FIG. 9 is only one example of the components of a message digest. Some of the components may be removed while other components may be added. For example, the message digest may include discard bits. Discard bits are bits that are ignored. As another example, rather than having the entire encryption key, the message digest may include only the most significant bits or the least significant bits of the encryption key. Another message digest may be generated and include the remaining bits. Additionally, components, such as the algorithm selector bits (406) and key length (408) may be excluded from the message digest. By way of another example, the message digest may only include algorithm selector bits, an encryption key, and optionally discard bits. It should be apparent to one of ordinary skill in the art that the order of the components may vary.

By way of another example, the change value (412) of the first message digest may be inputted to the n-bit generator along with the original inputs to produce a second message digest. In the example, the resulting second message digest may include two encryption solutions. Specifically, two encryption solutions may be extracted from the second message digest. In the example, the first user would transmit confidential communications by encrypting the confidential communications using a first encryption solution and receive confidential communications by decrypting the confidential communications using the second encryption solution. Similarly, in the example, the second user would transmit confidential communications by encrypting the confidential communications using the second encryption solution and receive confidential communications by decrypting the confidential communications using the first encryption solution.

Figure 10:
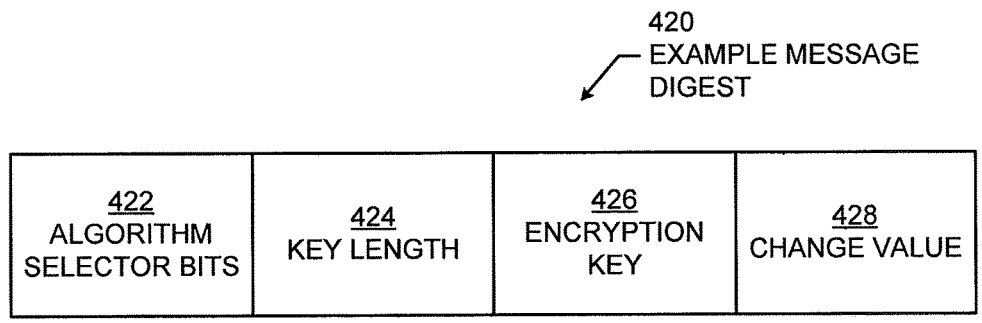

FIG. 10 shows another example of a message digest (420) in accordance with one or more embodiments of the invention. As shown in the example in FIG. 10, a message digest (420) may include only algorithm selector bits (422), a key length (424), an encryption key (426), and a change value (428). Although example FIG. 10 shows the ordering of the components of the message digest (420) as the same as in example FIG. 9, the ordering of the components may vary between message digests. For example, the encryption key may be the entire message digest, the first m-bits of the message digest, the middle m-bits of the message digest, etc. Further, each security application is similarly configured to extract the same set of bits for each of the components. For example, both the member A's security application and member B's security application may be configured to extract bits starting in position 56 and ending in position 184 as the encryption key.

Returning to the discussion of FIG. 2B, rather than the initial message digest having an encryption key, the initial message digest created in Step 217 of FIG. 2B may include a shared secret(s) as discussed above with reference to Step 207 in FIG. 2A.

FIGS. 3A and 3B show flowcharts for using the initial message digest to generate an encryption key. As shown in FIG. 3A, in Step 221, shared secret(s) are extracted from the initial message digest. Extracting the shared secret(s) may be performed as discussed above with reference to Step 207 in FIG. 2A.

Continuing with FIG. 3A, in Step 223, a new message digest is generated using the shared secret(s) as inputs for the n-bit generator. For example, the encryption module may call the n-bit generator and pass the parameters of the shared secret(s). The new message digest may be interpreted as, for example, any of the example message digests discussed above and shown in FIGS. 9 and 10.

In Step 225 of FIG. 3A, an encryption key is extracted from the resulting message digest. Extracting the encryption key may include the encryption module identifying the bit positions corresponding to the encryption key and separately storing the series of bits in the identified bit positions as the encryption key. In one or more embodiments of the invention, the storage of the series of bits may be temporary, such as in cache memory or random access memory (RAM). Alternatively or additionally, the series of bits may be extracted on an as needed basis for immediate use. In addition to extracting the encryption key, as discussed above, algorithm selector bits, key length and other components of the message digest may be extracted. Extracting the encryption key may be performed similar to extracting the secrets as discussed above with reference to Step 207 in FIG. 2. For example, similar to using the shift bits to designate the start of a secret, the shift bits may be used to designate the start of an encryption key.

FIG. 3B shows another example flowchart for using the initial message digest. Specifically, FIG. 3B shows an example for generating multiple message digests, where each message digest includes some of the components for encrypting a communication. In Step 231, the shared secret(s) are extracted from the initial message digest. Extracting the shared secret(s) may be performed as discussed above.

In Step 233, a second message digest is generated using the shared secret(s) as inputs for the n-bit generator. Generating the second message digest may be performed in a similar manner to that discussed above with reference to Step 223 in FIG. 3A.

In Step 235, the change value and other components are extracted from the second message digest. Extracting the components may be performed in a manner similar to the extraction of the encryption key as discussed above in Step 225 of FIG. 3A. The other components that are extracted may include, for example, the most significant bits of the encryption key, the least significant bits of the encryption key, the algorithm selector bits, etc.

In Step 237 of FIG. 3B, the change value is combined with the shared secrets to create an interim dynamic secret. Combining the change value with the shared secrets may be performed, for example, by a bit shuffler. Specifically, any of the operations discussed above with respect to the bit shuffler may be performed to combine the change value with the shared secrets. In one or more embodiments of the invention, a number is added to the change value or result to account for a possibility that the change value is zero. By way of example and not limitation, the combination may be the change value XOR'd with the dynamic secret plus one.

In Step 239, a third message digest is generated using the interim dynamic secret and the shared secrets as inputs to the n-bit generator. Step 239 may be performed, for example, in a manner similar to the above discussion with reference to Step 233. In one or more embodiments of the invention, rather than performing Step 237 to create an interim dynamic secret and then performing Step 239 to generate a third message digest using the interim dynamic secret, the third message digest may be generated using the change value, the dynamic secret, and the shared secret as inputs into the n-bit generator.

In Step 241, a change value and other components are extracted from the third message digest in accordance with one or more embodiments of the invention. Extracting a change value and the other components may be performed similar to the above discussion with reference to Step 235.

In Step 243, a determination is made whether to create another message digest. In one or more embodiments of the invention, each security application is configured to create an identical number of message digests. Additional message digests may be generated to create additional bits for an encryption key and to create additional components.

If a determination is made to create an additional message digest, then the steps repeat starting with Step 237. In Step 237, the change value extracted in Step 241 is used with the shared secrets to create a new interim dynamic secret. Alternatively, rather than using the shared secrets for subsequent message digests, the previously created interim dynamic secret may be used. The loop back to create additional message digests may be a loop back to Step 235, Step 237, or Step 239 depending on the embodiment and the total number of message digests requested by the security application.

Alternatively, if a determination is made not to create another message digest, an encryption solution is created from the components of the message digests in Step 245. For example, the least significant bits of the encryption key may be combined with the most significant bits of the encryption key to create a single encryption key. The encryption solution may be used to encrypt and decrypt communications. Encrypting a communication may be performed for example, by accessing the algorithm selector table to identify the encryption algorithm corresponding to the algorithm selector bits in the message digest. The communication to be encrypted is encrypted by applying the identified encryption algorithm with the encryption key to the communication. The resulting encrypted communication may be sent to the members and/or stored (e.g., stored on a local or remote storage device).

In FIGS. 3A and 3B, when the shared secret(s) are extracted, the shared secrets may be stored, for example, in the secrets repository. Thus, the stored secrets may be used to perform the Steps discussed above with reference to FIGS. 3A and 3B. Further, the shared secret(s) may be used to generate additional secrets as discussed above with reference to FIG. 2A.

FIG. 4 shows an example flowchart for communication between a client and a server in accordance with one or more embodiments of the invention. Specifically, the client is one of the members and the server is the second member of a group. In the example show in FIG. 4, consider the scenario in which the user of the client has an account at the server. The user's account is associated with an identifier and a shared secret(s). Further, in one or more embodiments of the invention, the client and the server each have a copy of shared secrets.

In Step 251, the server receives an identifier from the client in accordance with one or more embodiments of the invention. For example, the client sends a login identifier of the user's account. The client may obtain the login identifier from storage or from the user of the client.

In Step 253, the server determines whether the client is authorized. Specifically, the server accesses the accounts to determine whether an account corresponding to the identifier exists. If an account does not exist, the server may deny access to the client or request that the client provide a different identifier. The server may use the identifier to obtain the pre-shared secret from the account.

In Step 255, if the client is authorized, the server sends a challenge to the client. In one or more embodiments of the invention, the challenge may be a non-deterministic randomly (or pseudo-randomly) generated string of characters, a passphrase, or another piece of data. For example, the challenge may be a random (or pseudo-random) string of characters generated by a random (or pseudo-random) character generator or a random number generator. In one or more embodiments of the invention, prior to sending the challenge, the server combines the challenge with the shared secret to create a scrambled challenge and sends only the scrambled challenge to the client. In other embodiments the challenge might be transmitted in a clear-text, unscrambled format.

Further, in Step 257, the server receives the user's password from the client. The server may receive the user's password similar to the server receiving the identifier. In one or more embodiments of the invention, prior to sending the password, the client combines the password with a shared secret to create a scrambled password and sends only the scrambled password to the server. The server may combine the scrambled password with the shared secret to recreate the original password. In one or more embodiments of the invention, the combination performed by the server is an inverse function as the combination performed by the client to generate the scrambled password. For example, if the client combines the password with the shared secret using an XOR function, then the server uses an XOR function. As another example, if the client combines the password with the shared secret using the addition function, the server uses a subtraction function.

As another example, rather than combining the password with the shared secret, the client may combine the password with the challenge sent by the server to generate the scrambled password. The server may obtain the password using a similar method discussed above. Further, the client may obtain the challenge from using a similar method discussed above with regards to the server obtaining the password.

Further, although not shown in FIG. 4, the server and client may generate an initial message digest using the challenge and shared secrets and extract components from the message digest. By way of example and not limitation, the extracted components may include a user password and a change value. An example of the components extracted from the message digest is shown in FIG. 9 (discussed below).

In Step 259, the server determines whether the password is correct. Specifically, the server may determine whether the password received from the client is the same as a password previously known by the server (e.g., generated or previously provided by the client when creating the account). If the password is not the same, the server may deny access to the account. Alternatively, the server may allow the client one or more additional attempts to verify itself. In one or more embodiments of the invention, the client is afforded log-in attempts a preset number of times.

If in Step 259, the server determines that the password is correct, then the server generates a message digest using the shared secrets, the client password, from a previously generated message digest (discussed above), the challenge, and/or a portion thereof as inputs to the n-bit generator in Step 261. Generating the message digest may be performed as discussed above with reference to Step 217 in FIG. 2B. As described above the initial message digest may be generated following Step 255.

Although not shown in FIG. 4, similar to the server generating the message digest, the client also generates the same message digest using the client's n-bit generator. Specifically, the client uses the shared secrets and the challenge that the client received to generate the message digest.

Continuing with FIG. 4, in Step 263, communications sent between the client and server are encrypted and/or decrypted using the message digest (or portions thereof). Encrypting and decrypting the communications may be performed as discussed above.

Although FIG. 4 shows a flowchart of only the server authenticating a client using the identifier and the shared secrets, the client may also verify the identity of the server following the same steps.

Figure 5A:
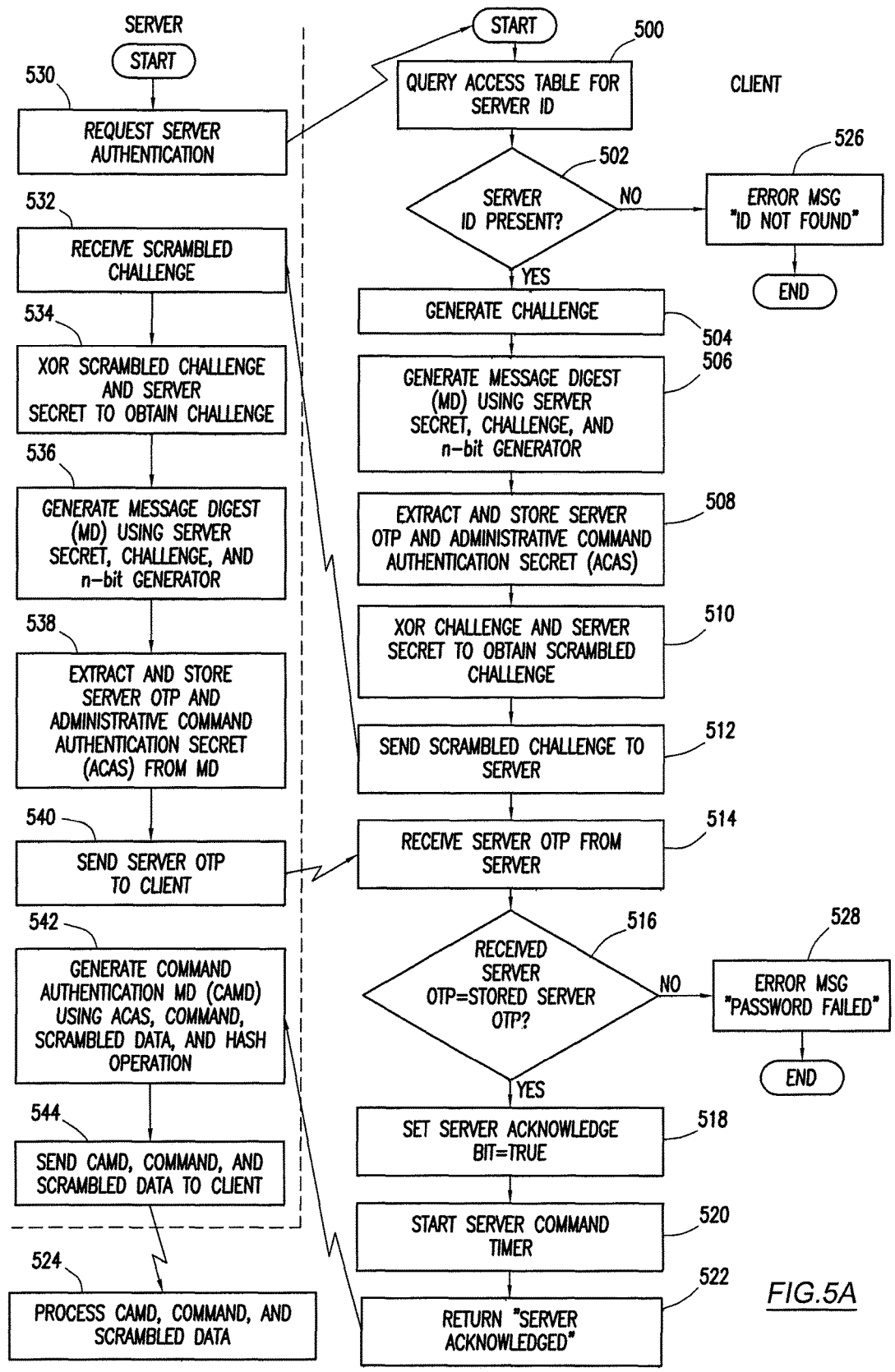
Figure 6:
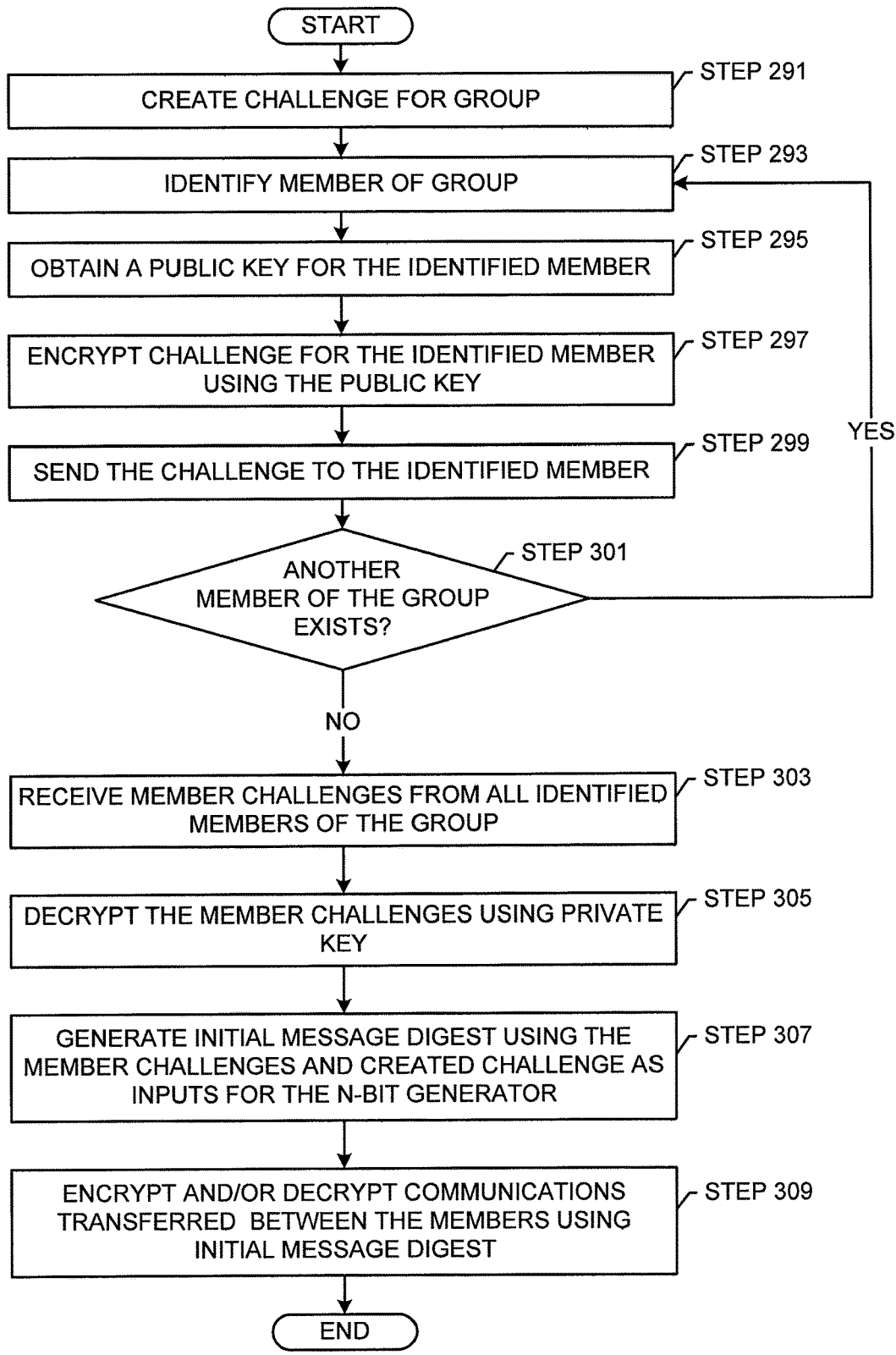

FIG. 5A shows a flowchart detailing the authentication of the server to the client in accordance with one or more embodiments of the invention. In Step 530, the server sends an server authentication command to the client. In one embodiment of the invention, the server authentication command includes a server ID. In Step 500, the client may query a data structure in the secure persistent storage to determine the presence of the server ID. In Step 502, a determination is made about whether the server ID is present in the data structure. If the server ID is present, then the process proceeds to Step 504; otherwise, the process proceeds to Step 526.

In Step 504, the client generates a challenge using, for example, a random or pseudo-random number generator. In one embodiment of the invention, the generated challenge is stored in the RAM of the client.

In Step 506, a message digest is generated by an n-bit generator using the server secret, and the challenge (generated in Step 504) as inputs.

In Step 508, the server one time password (OTP) and the Administrative Command Authentication Secret (ACAS) are extracted from the message digest and stored in, from example, the RAM of the client. FIG. 5B shows an example of the message digest (150) generated in Step 506 that includes the server OTP (152) and the ACAS (154). Further, the length of the individual components in the message digest as well as the order of the individual components within the message digest may vary based on the implementation.

Returning to FIG. 5, in Step 510, the XOR function is applied to the challenge and the server secret to obtain a scrambled challenge. In one embodiment of the invention, Step 510 is not performed and an unscrambled challenge is transmitted to the server in Step 512. Otherwise, in Step 512, the scrambled challenge is sent to the server. As discussed above, if the challenge is not scrambled in Step 510, then the challenge and, not the scrambled challenge, is sent to the server. In one embodiment of the invention, Steps 510 and 512 may be performed prior to Step 506. In such cases, the aforementioned order of the Steps may allow the n-bit generator on the client to perform various steps while awaiting a response from the server.

In Step 532, the server receives the scrambled (or unscrambled challenge) from the client. In Step 534, the server obtains the unscrambled challenge (if a scrambled challenge is sent from the client) by applying the XOR function to the scrambled challenge and the server secret. Step 534 is only performed if a scrambled challenge (as opposed to an unscrambled challenge) is received. Otherwise, an unscrambled challenge is used in Step 536. In one embodiment of the invention, the bit shuffler does not apply the same function to the inputs to the n-bit generator as the function used to generate the scrambled challenge from the administrator secret. For example, if the XOR function is used to generate the scrambled challenge then the XOR function is not used by the bit shuffler in the generation of the ACAS.

In Step 536, the server generates a message digest using an instance of the same n-bit generator currently implemented by the client along with the server secret (currently stored with the server) and the challenge (obtained in Step 530 (and, optionally, 534)) as inputs.

In Step 538, the server OTP and the ACAS are extracted from the message digest generated in Step 536 and stored by the server. In Step 540, the server sends the server OTP obtained in Step 538 to the client. In Step 514, the client receives the server OTP from the server. In Step 516, the server OTP obtained in Step 514 is compared with the server OTP obtained in Step 508. If the server OTPs match, then the process proceeds to Step 518; otherwise, the process proceeds to Step 528. In Step 528, the server is notified that the server OTPs did not match and, as such, the server has not been authenticated to the client.

In Step 518, the status bits in the client are set to indicate that the server has been authenticated. In Step 520, an server command timer is started. The server command timer prevents the status bits indicating that the server is authenticated to the client from being permanently set and also prevents attacks via server commands by limiting response time from a would be attacker.

At this stage, after the server has been authenticated to the client, the server may send commands and content to the client. Specifically, in Step 542, the server may generate a Command Authentication Message Digest (CAMD) using a hash operation along with the ACAS, a command (to be performed on the client), and the scrambled data as inputs.

Referring to FIG. 5C, the scrambled data (608) is generated by combining unscrambled data (606) with the ACAS (604) using an XOR function (though other functions may be used). In one embodiment of the invention, the unscrambled data (606) includes an identifier and a secret field (along with the associated length parameters). The identifier may identify the type of data in the secret field and the secret field includes the corresponding data.

Figure 5D:
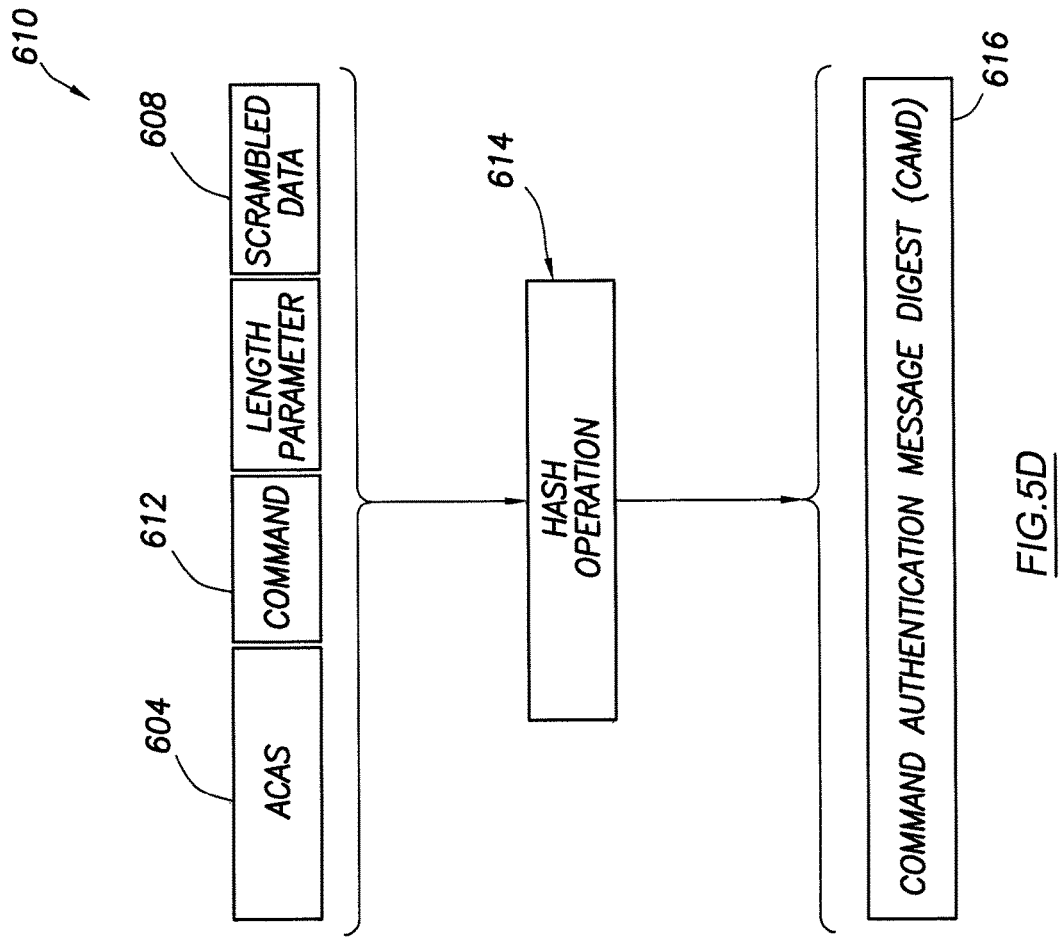

Referring to FIG. 5D, the CAMD (616) is generated using the ACAS (604), the command (612), and the scrambled data (608) along with a hash function (614). The length parameter (LP in FIG. 5D) for the command, which defines the length (in bits) of the command, may or may not be used to generate the CAMD. The commands that may be requested by the server may include any communication between the server to the client Returning to FIG. 5A, in Step 544, the CAMD, the command, and the scrambled data are sent to the client. In one embodiment of the invention, the command may also be scrambled (using, for example, the XOR function and the ACAS) to generate a scrambled command. In Step 524, the client receives the CAMD, the command (scrambled or unscrambled) and the scrambled data, and proceeds to process the received data as described in FIG. 5E.

Figure 5E:
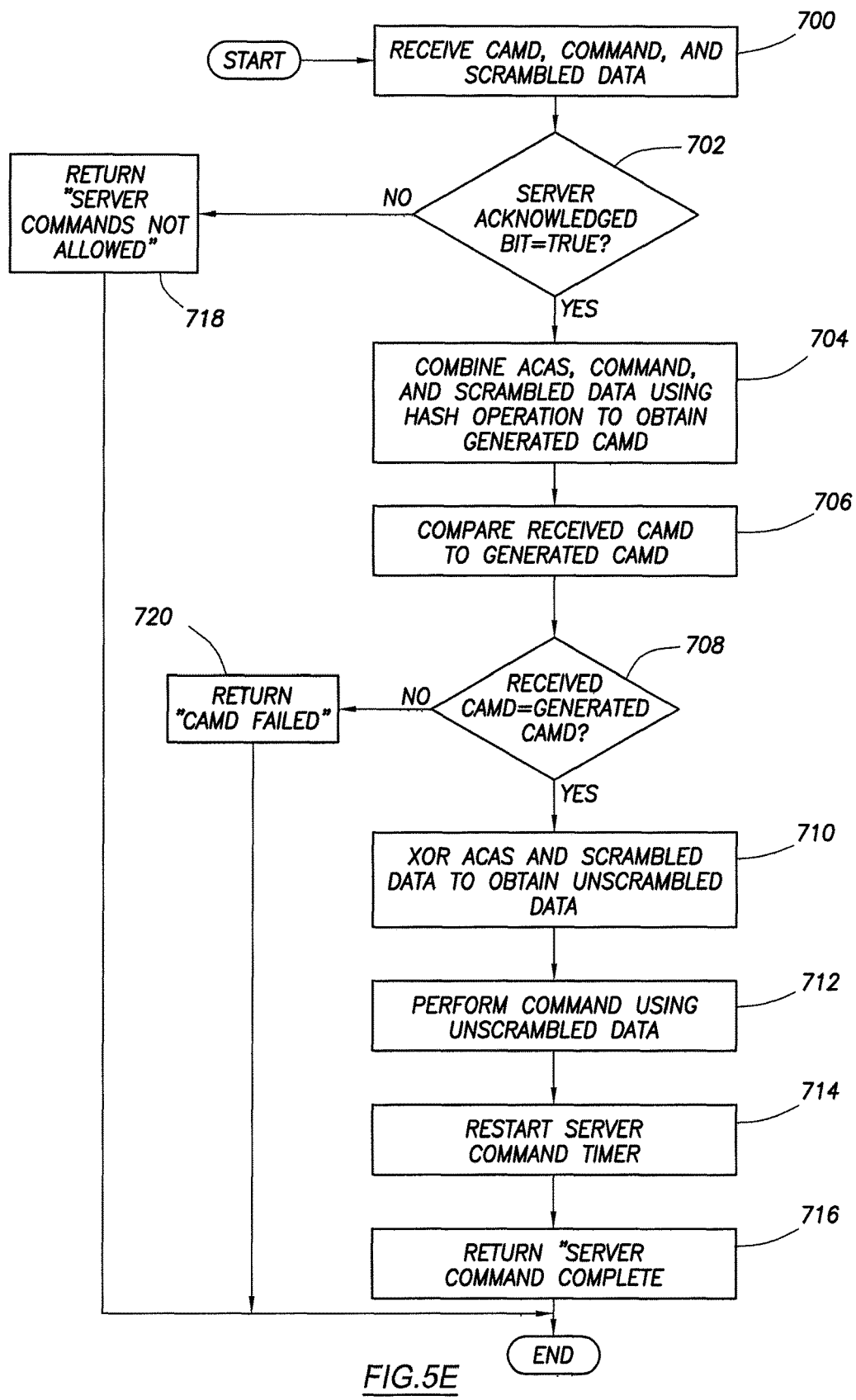

FIG. 5E shows a flowchart for processing a command received from the server in accordance with one or more embodiments of the invention. In Step 700, the client receives a CAMD, command (scrambled or unscrambled), and scrambled data from the server. In Step 702, a determination is made about whether the server has been authenticated to the client using, for example, the status bits in the client. If the server has been authenticated to the client, the process proceeds to Step 704; otherwise, the process proceeds to Step 716. In Step 704, the ACAS (obtained in Step 508 of FIG. 5A), the command (in an unscrambled form), and the scrambled data are used as input into a hash operation to generate a CAMD. The hash operation corresponds to the same hash operation being implemented by the server in Step 542 of FIG. 5A. In Step 706 of FIG. 5E, the CAMD received in Step 700 is compared with the CAMD generated in Step 704.

In Step 708, a determination is made about whether the CAMDs match. If the CAMDs match, the process proceeds to Step 710; otherwise the process proceeds to Step 720. In Step 710, the unscrambled data is obtained from the scrambled data using the XOR function and the ACAS (obtained in Step 508). In Step 712, the command (received in Step 700) is performed by the client using the unscrambled data obtained in Step 710. In Step 714, the server command timer is reset. In Step 716, the server is notified that the command has been completed.

In Step 718, the server is notified that it is not allowed to send commands to the client. In Step 720, the server is notified that the CAMD it generated in Step 542 does not match CAMD generated in Step 704.

FIG. 6 shows a flowchart for a group communication in which members may not have associations with other members of the group. Although FIG. 6 is shown and discussed below from the prospective of one of the members of the group, the steps discussed below are performed by each member of the group so that all members generate the same initial message digest. The security application may perform the steps with or without input from a user of the member.

In Step 291, the member creates a challenge for the group. The same challenge is generated for all members of the group. Creating the challenge may be performed, for example, as discussed above with reference to Step 504 in FIG. 5A.

Continuing with FIG. 6, a member of the group is identified in Step 293. Specifically, an identifier is obtained from the member. In Step 295, the identifier is used to obtain a public key for the identified member from the public key repository. Alternatively, the member may provide an identifier and a public key, which is confirmed/verified with the public key repository in Step 295.

In Step 297, the challenge created in Step 291 is encrypted using the identified member's public key. The encryption is performed using a predefined asymmetric encryption algorithm. In Step 299, the encrypted challenge is sent to the identified member.

In Step 301, the member determines whether another member of the group exists that has not received the challenge. If another member of the group exists, then the flowchart repeats beginning with Step 293 to send the challenge to the next member of the group.

In Step 303, member challenges are received by the member from all other identified members of the group. Specifically, similar to the member sending the same member challenge to all members of the group, the other members of the group also each send a challenge to all of the other members. Thus, all members of the group have a challenge from each other member.

In Step 305, the member decrypts the received member challenges using the member's private key. The decrypted member challenges along with the challenge sent by the member are used as inputs to the n-bit generator to generate an initial message digest in Step 307. Generating the initial message digest may be performed as discussed above with reference to Step 217 in FIG. 2B. Specifically, after all members decrypt each of the challenges, all members have the same inputs for the n-bit generator. Thus, because the n-bit generators perform the same functions and produce deterministic results, the resulting message digests generated by all of the members are identical.

Continuing with FIG. 6, the member encrypts and decrypts the communications transferred by the members using the initial message digest (or one or more portions thereof) in Step 309. Encrypting and decrypting the communications may be performed as discussed above with reference to Step 219 in FIG. 2B and FIGS. 3A and 3B.

During or at the end of a session, the members of a group may agree to change the encryption key and/or the secrets. For example, the agreement may be based on a signal passed between the members when one of the members requests that the encryption key be changed. As another example, the agreement may be based on a pre-agreed boundary/threshold at which a new encryption key is generated. For example, the members may agree that a new encryption key should be generated every five minutes, with every 20 sessions, based on the amount of data exchanged, etc.

FIG. 7A shows a flowchart for changing an encryption key. In Step 311, a change of encryption key is initiated by the group or one of the members thereof. As discussed above, the initiation may be based on a message, a pre-agreed period, threshold or boundary etc.

In Step 313, intermediate results of the last performance of the n-bit generator and the last generated change value are obtained. As discussed above, the intermediate results may correspond to the output of the bit shuffler prior to performing the hash function. Further, each member may extract the change value from the last generated message digest.

In Step 315, each member generates a new message digest using the intermediate results and the last change value as inputs to the n-bit generator. Generating the new message digest may be performed similar to the above discussion with reference to Step 239 in FIG. 3B. Continuing with FIG. 7A, in Steps 313 and 315, rather than using the intermediate results, the dynamic secret, the dynamic secret and the static secret, or the interim dynamic secret may be used in accordance with one or more embodiments of the invention.

In Step 317, a new encryption key or encryption solution is extracted from the new message digest. Extracting the new encryption key may be performed as discussed above with reference to Step 225 of FIG. 3A. After the new encryption key is extracted, the new encryption key may be used to encrypt and decrypt communications between the members of the group.

FIG. 7B shows an example flowchart for changing the secrets at the end of a communication session in accordance with one or more embodiments of the invention. In Step 321, a communication session is finalized with the group. For example, the group members may send a message ending the communication session. Each member may wait until the member receives confirmation from all other members of the group.

In Step 323, the initial dynamic secret(s) and the final change value used in the communication session are obtained. For example, the initial secret(s) may be the secret(s) generated in the initial message digest or a secret stored in the secrets repository. The final change value may correspond to the last generated change value. For example, the final change value may be obtained as discussed above with reference to Step 313 in FIG. 7A.

Continuing with FIG. 7B, in Step 325, a new message digest is generated using the initial secret(s) and the final change value as inputs to the n-bit generator. In Step 327, the new secret(s) is extracted from the new message digest. The new secret(s) may be used to establish shared secret(s) and a group association for future secure use in which case the shared secret(s) will be placed in the secrets repository. Specifically, each member of the group may store the new shared secret(s) in their corresponding secrets repository. Because each member generates and stores the same new shared secret(s), the members use the same secrets in the next communication session.

The shared secret(s) may be used for many different types of communications (exchanges) between group members. For example, the static secret may be used to create encryption solutions to encrypt communications in a chat session, emails, files, or other types of communications. For example, the dynamic secret may be used with or without the static secret when the dynamic secret remains unchanged between when the encryption key is created and the communication is decrypted (e.g., a chat session, emails, or other types of communications). FIG. 8 shows a flowchart for encrypting a file in accordance with one or more embodiments of the invention. Specifically, in FIG. 8 an encryption key is generated for a specific file in accordance with one or more embodiments of the invention.

In Step 331, the member sending the file extracts a shared secret from the initial message digest or secrets repository. Extracting the shared secret may be performed as discussed above in Step 221 of FIG. 3A. Further, the member identifies the file to communicate to the members in Step 333 of FIG. 8.

Figure 11:
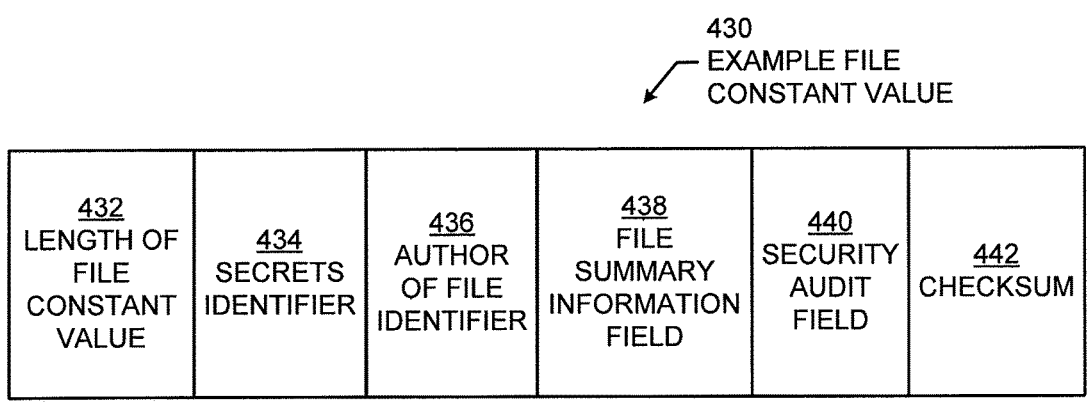
FIG. 11 shows an example file constant value in accordance with one or more embodiments of the invention.

In Step 335, the member generates a file constant value describing the file. The file constant value is a string of bits that includes information to assist the members of the group to obtain information about the file without decrypting the file. Further, the file constant value may be used to recreate the encryption key to decrypt the file. FIG. 11, discussed below, provides an example of a file constant identifier.

Continuing with discussion of FIG. 8, a message digest is generated using the shared secret(s) and the file constant value as inputs into the n-bit generator in Step 337.

In Step 339, the change value and other components are extracted from the message digest. Extracting the components may be performed similar to extracting the encryption key discussed above in Step 225 of FIG. 3A. The other components that are extracted may include, for example, the most significant bits of the encryption key, the least significant bits of the encryption key, the algorithm selector bits, etc.

In Step 341, a determination is made whether to create another message digest. In one or more embodiments of the invention, each security application is configured to create an identical number of message digests. Additional message digests may be generated to create additional bits for an encryption key and additional components.

In Step 343 of FIG. 8, the change value is combined with the shared secret(s) to create an interim secret. Combining the change value with the shared secret(s) may be performed, for example, by a bit shuffler. Specifically, any of the operations discussed above with respect to the bit shuffler may be performed to combine the change value with the shared secret(s). For example, the combination may be change value XOR'd with the shared secret(s) and/or the interim secret.

In Step 345, a message digest is generated using the interim secret and the shared secret(s) as inputs to the n-bit generator. Step 345 may be performed, for example, as discussed above with reference to Step 337. In one or more embodiments of the invention, rather than performing Step 343 to create an interim secret and then performing Step 345 to generate another message digest using the interim secret, the next sequential message digest may be generated using the change value and the shared secret(s) as inputs into the n-bit generator.

Continuing with FIG. 8, from Step 345 the logic flow continues with Step 347, the change value and other components are extracted from the message digest in accordance with one or more embodiments of the invention. Extracting the change value and the other components may be performed as discussed above with reference to Step 339.

In Step 341, if a determination is made to create an additional message digest, then the steps repeat starting with Step 343. In Step 343, the change value extracted in Step 347 is used with the shared secret(s) to create a new interim secret. Alternatively, rather than using the shared secret(s) for subsequent message digests, the previously created interim secret may be used.

Alternatively, if a determination is made not to create another message digest; in Step 349, a file is encrypted using the components of the message digest. Specifically, an encryption solution is created from the components of the message digest(s). For example, the least significant bits of the encryption key may be combined with the most significant bits of the encryption key to create a single encryption key.

Encrypting the file may be performed for example, by accessing the algorithm selector table to identify the encryption algorithm corresponding to the algorithm selector bits in the message digest. The file is encrypted by applying the identified encryption algorithm with the encryption key.

In Step 351, the resulting encrypted file is sent to the members of the group with the constant value. In order to decrypt the file, the members of the group may extract the secrets identifier (discussed below and in FIG. 11) from the constant value. Next, the members use the secrets identifier to search the secrets repository for the secrets associated with the secrets identifier. Specifically, the members used the secrets identified by the secrets identifier and the received file constant value to perform Steps 337-341 to obtain the encryption solution. From the encryption solution, the members identify the encryption algorithm and the encryption key to decrypt the file.

FIG. 11 shows an example file constant value. As shown in FIG. 11, the example file constant value (430) may include a length of the file constant value (432), a secrets identifier (434), an author of the file identifier (436), a file summary information field (438), a security audit field (440), and a checksum (442).

The length of the file constant value (432) specifies the number of bits in the file constant value (430). The secrets identifier (434) is an identifier in the secrets repository of the secrets used by the member in Step 331 of FIG. 8 and/or a previously generated message digest having the secret. In one or more embodiments of the invention, the secrets used by the member in Step 331 of FIG. 8 only include static secrets. In one or more embodiments of the invention, because each member associates the same secrets with the same identifier, the secrets identifier identifies the same secret(s).

The author of the file identifier field (436) identifies the user that created the file in accordance with one or more embodiments of the invention. For example, the author may be one of the members. In one or more embodiments of the invention, the author of the file identifier field (436) identifies the original author of the file. Alternatively or additionally, the author of the file identifier field (436) may identify the author of the resulting encrypted file. For example, the author of the file may identify the member performing the Steps of FIG. 8.

In one or more embodiments of the invention, the file summary information field (438) includes metadata about the file. For example, the file summary information field (438) may include the timestamps in which the file was created, accessed, and/or modified, the size of the file, and/or any other information about the file. By including the metadata, members of the group do not need to decrypt the file to obtain the metadata. Further, by including one or more timestamps in the metadata, a different encryption key may be generated for each file. For example, if the same file is saved and then encrypted five times in sequence, due to the delay in encrypting, each file would have a different time stamp and hence a different encryption key or encryption solution in accordance with one or more embodiments of the invention.

In one or more embodiments of the invention, the security audit field (440) provides security tracking information. The security audit field includes information that the user is following a security policy.

In one or more embodiments of the invention, the checksum (442) is a value used to determine whether the constant value has been intentionally or unintentionally modified. For example, the checksum may be generated using a hash function on the constant value (430). Alternatively, the checksum may be one of many error correcting checksums which would allow any modification to be reversed.

Although FIG. 11 shows a collection of components of the file constant value, some of the components of the file constant value may be omitted while additional components may be added to and/or the order changed of the file constant value without departing from the scope of the invention.

The following is an example in accordance with one or more embodiments of the invention. The following example is for illustration purposes only and not intended to limit the scope of the invention. In the following example, consider the scenario in which a group has three members: Bob's computing device (computing device B), Joe's computing device (computing device J), and Sarah's computing device (computing device S).

With the first communication, the security application on computing device B, the security application on computing device J, and the security application on computing device S each create a challenge. For example, computing device B's challenge is "454Bear", computing device J's challenge is "myTower", and computing device S's challenge is "d68saf." Further, each member accesses a certificate authority to obtain the public key of each other member. Computing device B's security application encrypts "454Bear" using computing device J's public key and sends the resulting encrypted challenge to computing device J's security application. Similarly, computing device B's security application encrypts "454Bear" using computing device S's public key and sends the resulting encrypted challenge to computing device S's security application. Computing device J's security application and computing device S's security application similarly encrypt their challenges using the other members' public keys and send their challenges.

After receiving the challenges, computing device B's security application, computing device J's security application, and computing device S's security application decrypt each of the challenges using their corresponding private key. Computing device B's security application, computing device J's security application, and computing device S's security application each input "454Bear," "myTower," and "d68saf" into their respective n-bit generators to obtain a message digest. Because the n-bit generator provides a deterministic, pseudo-random result, the resulting message digest is the same for computing device B, computing device J, and computing device S. Accordingly, computing device B's security application, computing device J's security application, and computing device S's security application may use the message digest to populate a secrets repository, create encryption keys, and encrypt and decrypt the communications transferred between them.

For example, computing device B's security application may send a file to computing device S's security application and computing device J's security application by creating an encryption key using the message digest, encrypting the file with the encryption key and a symmetric encryption algorithm, and sending the encrypted file. Computing device S's security application and computing device J's security application, who also have the same message digest can create the same encryption key and decrypt the file. A nefarious computer system, which is not capable of generating the message digest is unable to create the encryption key. Moreover, because computing device B's security application, computing device S's security application, and computing device J's security application may continually change the encryption key using the initial message digest and subsequent message digests, the nefarious computer system may be unlikely to identify the correct encryption key for the correct message.

Figure 12:
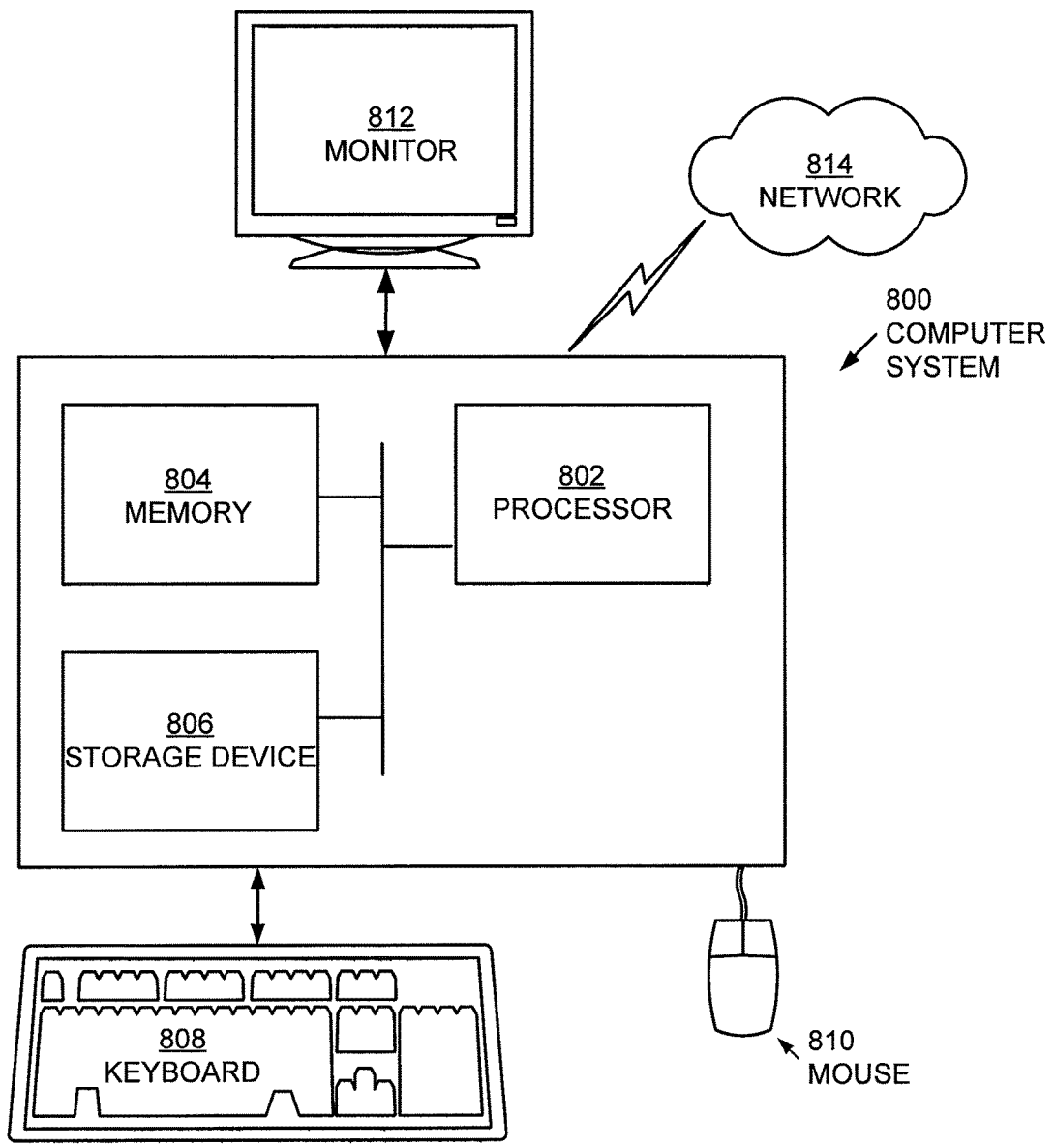
FIG. 12 shows a computer system in accordance with one or more embodiments of the invention.

Embodiments of the invention may be implemented on virtually any type of computer system regardless of the platform being used. The computing device may be the computer system, execute on the computer system, be an external device of the computer system, etc. For example, as shown in FIG. 12, a computer system (800) includes one or more computing processor(s) (802), associated memory (804) (e.g., random access memory (RAM), cache memory, flash memory, etc.), an internal and/or external storage device (806) (e.g., a hard disk, an optical drive such as a compact disk drive or digital video disk (DVD) drive, a flash memory stick, universal serial bus (USB) drive, smart card, smart phone, etc. connected via a physical or wireless interface), and numerous other elements and functionalities typical of today's computers (not shown). The computer system (800) may also include input means, such as a keyboard (808), a touch screen, a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining a secure communication session, the method comprising:
   receiving, via a first communication channel and by a server; a client identifier from a client;
   determining, by the server, whether the client is authorized based on the client identifier;
   in response to determining that the client is authorized, sending, via a second communication channel and by the server, a challenge;
   receiving, via the first communication channel and by the server, a response from the client, said response comprising a combination of (a) information extracted from a message digest computed using the challenge sent by the server with (b) the challenge sent by the server; and
   in response to determining that the response is correct, generating, by the server, a cryptographic key for the secure communication by providing at least the challenge as an input to cryptographic key generator.

2. The method of claim 1, wherein the first communication channel comprises at least one selected from a group consisting of the Internet, short messaging service, Bluetooth, and email.

3. The method of claim 1, wherein the first communication channel is the Internet and the second communication channel is short messaging service.

4. The method of claim 1, wherein a secret known only to the server and the client is another input to the cryptographic key generator.

5. The method of claim 1, wherein the cryptographic key generator comprises a n-bit generator.

6. The method of claim 5, wherein the cryptographic key is derived from a message digest produced by the n-bit generator.

7. A system for obtaining a secure communication session, the system comprising: a computer processor; and a data repository for storing instructions that when executed by the computer processor cause the computer processor to:
   receive, via a first communication channel, a client identifier from a client;
   determine whether the client is authorized based on the client identifier;
   in response to determining that the client is authorized, send, via a second communication channel, a challenge;
   receive; via the first communication channel, a response from the client, said response comprising a combination of (a) information extracted from a message digest computed using the challenge sent by the server with (b) the challenge sent by the server;
   in response to determining that the response is correct, generate an encryption key using the challenge as an input to an n-bit generator.

8. The system of claim 7, wherein the first communication channel comprises at least one selected from a group consisting of the Internet; short messaging service, Bluetooth, and email.

9. The system of claim 7, wherein the first communication channel is the Internet and the second communication channel is short messaging service.

10. The system of claim 7, wherein a secret known only to the server and the client is another input to the n-bit generator.

11. A non-transitory computer readable medium comprising computer readable program code that, when executed by a processor, causes the processor to:
    receive, via a first communication channel; a client identifier from a client;
    determine whether the client is authorized based on the client identifier;
    in response to determining that the client is authorized, send, via a second communication channel, a challenge;
    receive, via the first communication channel, a response from the client, said response comprising a combination of (a) information extracted from a message digest computed using the challenge sent by the server with (b) the challenge sent by the server;
    in response to determining that the response is correct, generate an encryption key by providing at least the challenge as an input to an n-bit generator.

12. The non-transitory computer readable medium of claim 11, wherein the first communication channel comprises at least one selected from a group consisting of the Internet, short messaging service, Bluetooth, and email.

13. The non-transitory computer readable medium of claim 11, wherein the first communication channel is the Internet and the second communication channel is short messaging service.

14. The non-transitory computer readable medium of claim 11, wherein a secret known only to the server and the client is another input to the n-bit generator.

* * * * *